Figure 1:
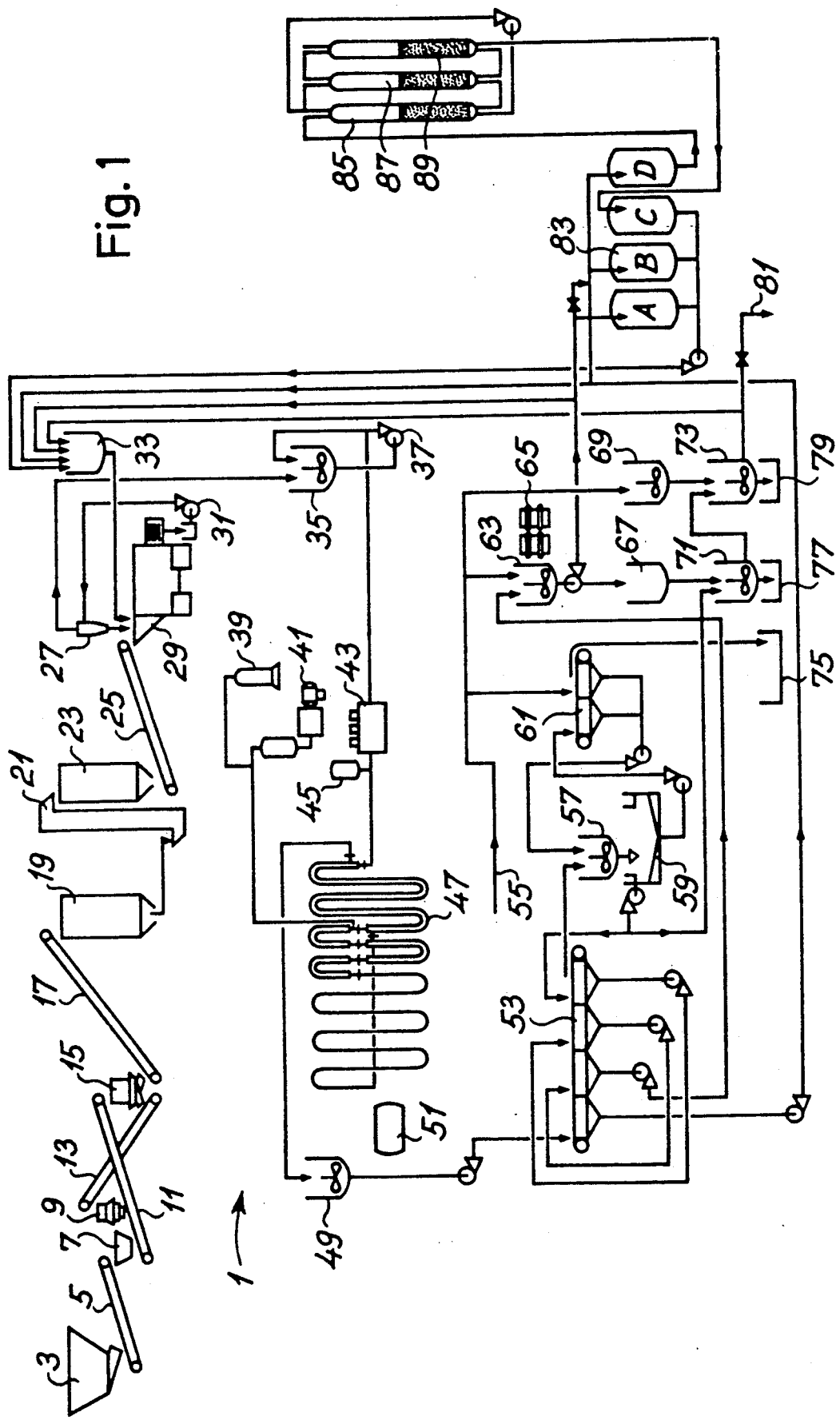

United States Patent [19]

Sorensen et al.

[11] Patent Number: 5,053,142

[45] Date of Patent: Oct. 1, 1991

[54] METHOD FOR TREATING POLLUTED MATERIAL

[75] Inventors: Emil Sorensen, Roskilde; Jorgen Jensen, Jyllinge; Erik Rasmussen, Gentofte; Bror S. Jensen; Belinda Bjerre, both of Roskilde, all of Denmark

[73] Assignees: NKT A/S, Brondby; Forskningscenter Riso, Roskilde, both of Denmark

[21] Appl. No.: 259,113

[22] PCT Filed: Feb. 15, 1988

[86] PCT No.: PCT/DK88/00024

§ 371 Date: Dec. 6, 1988

§ 102(e) Date: Dec. 6, 1988

[87] PCT Pub. No.: WO88/06144

PCT Pub. Date: Aug. 25, 1988

[30] Foreign Application Priority Data

Feb. 13, 1987 [DK] Denmark .............................. 0719/87

[51] Int. Cl.$^5$ .............................................. C02F 11/08
[52] U.S. Cl. ..................................... 210/742; 210/761; 210/762; 210/912
[58] Field of Search ............... 210/761, 762, 747, 721, 210/908, 909, 742, 743, 753, 754, 756, 758, 759, 766, 912-914

[56] References Cited

U.S. PATENT DOCUMENTS

| | | | |
|---|---|---|---|
| 3,696,929 | 10/1972 | Shah | 210/199 |
| 3,772,188 | 11/1973 | Edwards | 210/197 |
| 3,852,192 | 12/1974 | Fassell et al. | 210/761 |
| 4,052,302 | 10/1977 | Fletcher et al. | 210/762 |
| 4,155,848 | 5/1979 | Sato et al. | 210/761 |
| 4,174,280 | 11/1979 | Pradt et al. | 210/761 |
| 4,347,144 | 8/1982 | Bodenbenner et al. | 210/761 |
| 4,460,628 | 7/1984 | Wheaton et al. | 427/214 |
| 4,604,215 | 8/1986 | McCorquodale | 210/762 |
| 4,670,162 | 6/1987 | Robey | 210/761 |
| 4,721,575 | 1/1988 | Binning et al. | 210/761 |
| 4,751,005 | 6/1988 | Mitsui et al. | 210/762 X |
| 4,822,497 | 4/1989 | Hong et al. | 210/761 X |
| 4,869,833 | 9/1989 | Binning et al. | 210/761 |

FOREIGN PATENT DOCUMENTS

| | | |
|---|---|---|
| 1058946 | 6/1959 | Fed. Rep. of Germany . |
| 407565 | 10/1974 | Sweden . |
| 1308639 | 7/1970 | United Kingdom . |
| 2033366 | 5/1980 | United Kingdom . |

OTHER PUBLICATIONS

Perry's Chemical Engineers Handbook, 6th Ed., pp. 5.40-5.41.
D. Q. Kern et al, McGraw Hill, p. 29, "Process Heat Transfer".
Chemical Engineering Progress, vol. 75, No. 8, pp. 46-52.
Chemical Engineering Progress, vol. 81, No. 3, pp. 52-66.
Pollution Engineering, vol. 16, No. 4, pp. 47-49.

Primary Examiner—Tom Wyse
Attorney, Agent, or Firm—Birch, Stewart, Kolasch & Birch

[57] ABSTRACT

A method for treating polluted material such as industrial waste water or polluted water from other sources, sewage or sewage sludge or other forms of sludge, or polluted soil, to degrade oxidizable substances therein, comprising subjecting the polluted material to a wet oxidation process in a reactor so as to decompose and/or modify oxidizable substances therein and optionally improve the filterability of solids when present in the material; the material may optionally be pretreated so as to facilitate the wet oxidation process. Solid polluted material is preferably in the form of a liquid suspension, such as an aqueous suspension, when subjected to wet oxidation. The wet oxidation process is performed to such an extent, optionally with subsequent substantial removal of heavy metals, that the decomposed and/or modified substances remaining after the wet oxidation and the optional removal of heavy metals are substantially biodegradable.

41 Claims, 3 Drawing Sheets

METHOD FOR TREATING POLLUTED MATERIAL

The present invention relates to a method for degrading or decomposing undesirable oxidizable materials contained in various waste materials such as industrial or domestic waste-water, sewage or polluted soil.

In the modern industrialized world, increasing amounts of wastes have to be disposed of. Conventionally, wastes are disposed of either by depositing or dispersing them in suitable places in the environment, such as in dumps or land-fills or in the sea, or by decomposing or degrading them by chemical, microbiological or mechanical means, or by simple combustion.

Until quite recently the disposal of certain types of wastes was often carried out in a rather careless manner, often by merely depositing the waste more or less directly in the soil, or by burning the waste leading to emission of undesirable materials into the environment. Other forms of waste materials, such as industrial or domestic waste water, were often led directly into rivers, streams, lakes, or the sea. The consequences of these lax methods of waste disposal are now becoming increasingly apparent.

Among the most serious acute problems are the leaching of toxic or otherwise undesirable substances into the environment from soil in which they have been deposited, leading to pollution of ground water and/or other sources of drinking water. Great efforts are now being made to stop the leaching of toxic matter from waste material deposited in soil, and in many cases it has been found necessary to dig up and isolate the polluted soil in order to remove the undesirable substances.

Methods which have been used to treat such soil include extraction, thermal processes, chemical treatment, microbiological treatment, stabilization and encapsulation:

The extraction process employs water to which various chemicals, such as acids or bases, may be added. The use of extraction processes permits only partial removal of heavy metals, cyanides hydrocarbons and chlorinated hydrocarbons.

Thermal processes for the treatment of polluted soil entail e.g. counter current treatment with steam, after which the contaminated steam must be condensed and treated Heating polluted soil to 500°–600° C. leads to evaporation of volatile pollutants, and t gas-air mixture is then burned at ca. 1400° C. or otherwise treated. In total combustion processes the combustion takes place at ca. 1200° C. and the exhaust gases must then be treated The use of all these procedures normally leads to satisfactory destruction of all organic matter. However, this purification process is extremely energy. consuming and therefore very expensive to carry out. One disadvantage is that most of the heavy metals are not removed.

Chemical treatment entails the addition of chemicals which react with the pollutants in question, whereby these are destroyed or modified. A significant disadvantage of this method is that the soil is brought into contact with potentially dangerous substances which themselves have to be removed after treatment. Detailed knowledge of the concentration of pollutants is also required.

Microbiological degradation of organic material is a process which is well-known in the field of waste-water purification, e.g. in municipal purification plants where microorganisms, in the form of biofilm or active sludge, degrade organic material in a cheap and effective manner. In microbiological soil treatment, microorganisms and nutrients are added to the soil and degradation takes place by aerating the soil by mechanical cultivation, or in a process resembling compost formation. One of the disadvantages of this process is the wide variation of biodegradability of different compounds. The introduction of soil containing toxic substances can lead to the death of microorganims or, at best, very low degradation grades.

Stabilization and encapsulation processes are not purification processes as such and will not be discussed further.

The Presence of undesirable substances in industrial or domestic waste-water, sewage and sludge is also a problem, and a variety of different methods for treating these types of waste have been employed including subjecting the waste to chemical or microbiological degradation. A method for the chemical degradation of undesirable substances in waste which has been widely employed involves subjecting the waste to a wet oxidation treatment under conditions of high temperature and pressure. By this treatment, combustible organic materials may be oxidized by flameless combustion.

In U.S. Pat. No. 3,714,911 "Alkaline Pulping Black Liquor" is treated under oxidizing conditions. In GB 1,435,105 sludge from a purification plant is treated under oxidizing conditions in a reactor which is divided into chambers in GB 1,411,047 liquid or solid inflammable material which cannot be mixed or dissolved in water is treated in one or more tank reactors under oxidizing conditions. U.S. Pat. No. 4,229,296 discloses a one-step or multi-step reactor with phase separation, and GB 1,421,475 discloses a process relating to the treatment of aqueous waste containing dissolved organic material under oxidizing conditions. In U.S. Pat. No. 4,089,737 cellulose-containing material is de. lignified in aqueous medium under oxidizing conditions. GB 1,473,438 describes a tank reactor for combustion under oxidizing conditions, which reactor is divided into chambers.

In most cases, the organic material to be oxidized is dissolved or dispersed in a liquid which is then subjected to the oxidation treatment, or the organic material is in itself in a liquid form. The oxidation is an exothermic reaction and energy may be recovered from the destruction of waste materials consisting of combustible materials. An example of energy recovery in connection with wet oxidation of sewage and other waste materials is given by F. J. Zimmermann in GB 706,686 and GB 812,832, wherein the wet oxidation is carried out in a vertical tower reactor.

Wet oxidation reactions known in the art are to a great extent performed in reactors which are arranged in vertically extending deep wells or in reaction chambers arranged at the bottom of such wells.

In these reaction systems, the high pressure needed for the reaction to proceed is built up as the liquid descends in the well. Examples of such deep well wet oxidation systems are given by Fassel et al. in U.S. Pat. No. 3,852,192 and U.S. Pat. No. 3,920,548, W. J. Baller in U.S. Pat. No. 3,449,247, J. A. Titmas in U.S. Pat. No. 3,853,759, H. L. Lawless in US Patent No. 3,606,999 and G. C. Rappe in U.S. Pat. No. 4,671,351, which mainly use the system for wet oxidation and thus destruction of municipal and/or industrial sludge or sewage. Examples of deep-well oxidation systems in which aqueous dispersions of charcoal or tar sand containing minor amounts of combustible materials have been treated mainly with the purpose of obtaining energy from these materials which energy it is not otherwise economically feasible to exploit, are e.g. given by Bose et al. in U.S. Pat. No. 4,473,459.

Another problem which has been recognized in connection with the decomposition treatment of wet type wastes, such as sewage and sludge, is the difficulty associated with the filtration or other types of liquid/solid separation of these wastes. Thus, in ordinary sludge-treating plants, such as e.g. biological purification plants. the filtration step in the purification treatment is highly problemetical; the material to be filtered quickly blocks the pores of the filter resulting in a very slow, if any, filtration.

Many prior art wet oxidation methods focus on substantially total oxidation of organic wastes in order to obtain the highest possible degradation of these, preferably eventually resulting in water and low molecular weight organic compounds, such as carbon dioxide, and water.

According to the invention, polluting oxidizable material which does not solely comprise harmless high molecular weight organic compounds, but also highly toxic materials, may be decomposed to harmless material by being subjected to a wet oxidation treatment, optionally in combination with removal of heavy metals and/or a biodegradation process.

Thus, the present invention relates to a method for decomposing polluting oxidizable material from a polluted material such as industrial waste water or polluted water from other sources, sewage or sewage sludge or other forms of sludge, or polluted soil, comprising subjecting the polluted material to a wet oxidation process in a reactor so as to decompose and/or modify oxidizable substances therein and optionally improve the filterability of solids when present in the material, the material optionally being pretreated so as to facilitate the wet oxidation process, the wet oxidation process being performed to such an extent, optionally with subsequent substantial removal of heavy metals, that the decomposed and/or modified substances remaining after the wet oxidation and the optional removal of heavy metals are substantially biodegradable, if necessary separating the material into a solid and a liquid phase, and optionally subjecting the material or the liquid phase to a biodegradation process.

The term "polluted material" as used herein is used as a common designation for materials containing organic or inorganic substances, which are present or formed in an environment as a consequence of the presence and/or activity of human beings, including industrial activity in its widest sense, which, e.g., comprises domestic and industrial activity, agriculture, forestry and fishing industry, and which it is desired to remove from the environment with the main purpose of maintaining and/or improving the environment. Typically, the polluted material is of a type which is formed constantly or seasonally and which conventionally is considered to be a waste material, e.g. industrial waste water such as waste water from pharmaceutical and food industries, e.g. slaughterhouses or dairy industries, municipal or industrial sludge, sewage or sewage sludge, but also material which has been subjected to a sudden pollution, e.g. sudden releases of toxic matter into the environment, examples of which are sea water which has been polluted with oil or chemicals released from ships or boats or from containers which have been deposited in the sea or sudden industrial leaks to the environment, is to be understood to be a polluted material.

The term "oxidizable substances" as used in the present context refers to any substances which may be decomposed and/or modified by oxidation. In most cases, the oxidizable substances are of a type generally considered to be polluting, such as toxic or otherwise harmful substances, e.g. of the types discussed herein. Substances which in other relations are considered to be harmless or even useful, but which are not desired to be present in the material in question are, however, also to be understood within the definition of the term. Oxidizable substances such as oil and/or chemicals which are present in soil are, however, especially interesting in the present context, as no economical and easily practicable method for the removal of such substances from soil, has been known prior to the present invention. Many types of chemical and/or oil pollution of soil are or are contemplated to be removable by use of the present method. Thus. chemicals such as inorganic and/or organic cyanides, aliphatic hydrocarbons, aromatic hydrocarbons and halogenated aromatic hydrocarbons containing non-halogene functional groups, chlorinated aliphatic hydrocarbons and compounds containing sulphur (hydrogen sulphide, thiocyanates, mercaptans, etc.) may be decomposed to harmless substances such as low molecular weight organic molecules, e.g. carbon dioxide and acetic acid.

It is believed to be a novel and very important concept to subject polluted soil itself, rather than an extract or percolate therefrom, to wet oxidation and preferably subsequent biological degradation. Without being limited to any theory, it is believed that the oxidizable substances are absorbed on or distributed between the soil particles which thereby serve as a carrier for the polluting material, and that, therefore, the treatment of the polluted soil itself by the method of the invention is the most effective and economical way of purifying polluted soil. The amount of oxidizable substances carried by a specific soil deposit may accordingly depend on the nature of the soil, e.g. the porosity, size or reactivity of the soil particles, as well as on the nature of the substance. In this context, it is typically observed that soil containing large amounts of clay and/or organic matter, such as humus, contains larger amounts of polluting substances than soil containing large amounts of rock and/or gravel material.

The term "soil" as used herein refers to deposits which comprise the upper layer of earth on which plants grow and which consists of minerals, disintegrated rock, usually in admixture with various organic remains as well as lower lying earth layers, such as unconsolidated rocks, e.g. sand, till and clay. Thus, soil belonging to the ABC horizons of soil profiles, which in accordance with conventionally used terminology in the art refer to the upper earth layers, i.e. the upper soil and sub soil layers, are to be understood to be within the scope of the term "soil". In the present context, the term "soil" also embraces the ground or areas surrounding industrial plants. The ground, i.e. the treadable area on which the transportation of people and/or industrial objects takes place, may to a great extent be constituted by sand, gravel, coke, dust, cement and other inorganic material which has been subjected to pollution.

Thus, soil collected from refuse dumps or tips, as well as soil recovered from various types of industrial, municipal or domestic plants or locations, which may be mixed with a variety of inorganic and/or organic non-soil components, e.g. plant remains or various wastes, is in the present context termed soil.

The type of modification of oxidizable substances which may be obtained by the wet oxidation process comprises various chemical modifications such as formation of carboxylic or corresponding groups on some of the substances in the polluted material.

The wet oxidation of the polluted material may be carried out in any convenient manner, and various types of vessels or reactors, e.g. loop. tube or batch reactors, have been found to be useful in this regard. One type of reactor which the present inventors have found to be very useful for carrying out the wet oxidation treatment is a substantially horizontally arranged reactor. In contrast to many of the known wet oxidation methods, most of which are carried out in vertically and often subterraneanly arranged reactors, the present inventors have found that the substantially horizontally arranged reactor provides very satisfactory and controllable oxidation conditions which result in the desired degree of decomposition and/or modification of the oxidizable substances. The optimal oxidation conditions will depend on the type of material to be treated as well as the nature of the polluting material, and will be more specifically discussed in the following.

Suitably, the substantially horizontally arranged reactor comprises a tube or a number of interconnected tubes, and is preferably a plug flow tubular reactor. The term "plug flow tubular reactor" as used herein refers to a tubular flow reactor through which the material to be treated is continuously pumped. The flow of the material approaches, and is nearly identical to, ideal plug flow, which is defined as an orderly flow wherein no element of the material to be treated is mixed with any other element located ahead of or behind the element in question. Thus, there is no mixing or diffusion along the flow path, the result of which is that the passage time in the reactor of all the individual elements will be identical. To some extent there may be lateral mixing of the material to be treated in the plug flow tubular reactor owing to the vigorous flow conditions existing in the reactor. The plug flow tubular reactor is also known as a plug flow reactor, a slug flow reactor, a piston flow reactor, a tubular reactor, a pipe reactor and an unmixed flow reactor.

Preferably, the polluted material is in the form of a liquid suspension, such as an aqueous suspension, when subjected to wet oxidation. Polluted materials of a wet type, e.g. of the types discussed above, e.g. sewage or sludge, are in most cases inherently, or subsequent to stirring, in the form of a suspension, whereas polluted material of the solid type, e.g. soil, is suspended in a liquid such as water before being subjected to wet oxidation. In some cases, it may, however, be advantageous to further suspend the wet type materials to be treated, i.e. to dilute these materials by adding a liquid such as water, before subjecting the materials to wet oxidation. This will be discussed in detail below.

The concentration of solids in the liquid suspension to be subjected to wet oxidation may vary within wide limits and will, among other things, depend on the nature of the polluted material and the oxidizable substances to be treated and to what extent the wet oxidation is to proceed, i.e. the desired degree of decomposition and/or modification of the oxidizable substances, as well on the type of reactor and oxidation conditions employed Generally, the concentration of solids in the suspension to be treated should be adapted so that the most economical and practically realizable reaction conditions are obtained, especially when the wet oxidation is combined with a subsequent biodegradation process. This will be discussed in detail below. A concentration of solids in the liquid suspension within the range of 10-60%, based on the weight of the solids and the total volume or weight of the suspension has in most cases been found to be suitable. At concentrations lower than 10% (weight/volume), the wet oxidation treatment will in most cases not be economically feasible and the optional subsequent solid/liquid separation, e.g. filtration, puts heavy demands on the capacity of the separation equipment compared to the cases where more concentrated suspensions are handled. In the case of suspensions having a concentration higher than 60% (weight/volume), it may be difficult to obtain a sufficient flow of the suspension, and these high concentration suspensions may contain such high amounts of oxidizable material that it may be difficult to obtain the desired degree of decomposition and/or modification of this material under the reaction conditions in question.

Concentrations of solids in the liquid suspension within the range of 20-60% (weight/volume), such as 30-60%, and preferably within the range of 40-60% (weight/volume) and more preferably 40-55% (weight/volume), e.g. 45-55% (weight/volume) have been found to be useful for most purposes. A concentration of solids in the liquid suspension of about 50% (weight/volume) has proved to be especially suitable both with regard to the capability of the wet oxidation system of decomposing and/or modifying the oxidizable substances and the treatment of the suspension subsequent to the wet oxidation, e.g. the filtration. It must, however, be emphasized, that the optimal concentration of solids in the suspension depends on the wet oxidation reactor system to be used as well as the nature of the material and the oxidizable substances to be treated.

The particle size of the solids in the suspension is another feature which may be of importance in connection with the wet oxidation Process of the present invention Preferably, the particle size of the suspension is adapted so that it permits pumping of the suspension in the reactor system in question. Also, the size of the particles should be so adapted that the oxidizable substances contained in, or in connection with the particles is accessible to the wet oxidation process. Thus, when treating rather porous polluted materials which may contain large amounts of oxidizable substances in the pores, it may be desirable that the particles of these materials are of a size which makes the oxidizable substances contained in the pores accessible to oxidation.

At present, a particle size of at the most 2 mm is considered to be useful when the wet oxidation treatment is carried out in reactor systems which make use of conventional pumps and pumping valves, as problems may arise in connection with the passage of larger particles through the valves. Often, smaller particle sizes, e.g. particle sizes of at the most 0.75 mm or at the most 0.5 mm, such as at the most 0.2 mm and even at the most 0.150 mm, are suitable.

As the polluted material to be treated often contains particles which are too large in relation to the wet oxidation system in question, it may be necessary to crush, grind or otherwise comminute the material so as to obtain suitable particle sizes. The comminution may take place in any convenient manner, the type of which is not critical in relation to the present invention. An example of a suitable means for comminution of the polluted material is given below in connection with the explanation of FIG. 1.

If the polluted material is of a type which is to be suspended in a liquid, such as water, prior to wet oxidation, it is conveniently mixed with the liquid before the comminution, whereby the resulting mixture is then subjected to comminution and a suspension containing particles of the desired size may be obtained. Preferably, the liquid is added in an amount which results in the desired concentration of the suspension so that no further stirring or addition of liquid are necessary subsequent to the comminution.

As explained above, the wet oxidation of the polluted material may be performed in a wide variety of manners, being dependent, as explained above, on the type of material to be treated, the desired degree of oxidation of the material, and the type of wet oxidation or reactor system to be employed. In accordance with the present invention, it is, however, preferred, that the wet oxidation process a method according to any of the preceding claims wherein the wet oxidation process is performed either by means of an oxidizing agent or oxidizing agents added to the material prior to its introduction into the reactor, or by means of an oxidizing agent or oxidizing agents added to the material in the reactor, optionally at various positions in the reactor, or by means of a combination of an oxidizing agent or oxidizing agents added prior to the introduction of the material into the reactor and an oxidizing agent or oxidizing agents added to the material in the reactor, and the material in the reactor is subjected to conditions sufficient to result in the decomposition and/or modification of oxidizable substances in the material and optionally improve the filterability of the material.

Depending on the types of oxidizable substances and/or polluted material to be treated, and the form and amount in which they are to be treated, it may be advantageous to incorporate an oxidizing agent or oxidizing agents and/or an oxidizing-enhancing agent or oxidizing. enhancing agents in the polluted material prior to its introduction into the reactor. The material may in this way undergo some sort of preoxidation, rendering the subsequent wet oxidation treatment more efficient. In most cases, however, the oxidizing agent or agents is or are added to the material in the reactor.

The oxidizing agent or agents which is or are suited to be incorporated will, of course, depend on the case in question. Preferably, the oxidizing agent comprises an oxygen-containing gas, preferably a gas containing more than 20% of oxygen by volume, preferably more than 50%, more preferably more than 70%, and most preferably more than 80%, e.g. 100% of oxygen by volume. The oxygen-containing gas will in most cases be introduced into the reactor through an inlet or through several inlets located at different positions in the reactor. The amount in which the things, dependent on the desired degree of decomposition and/or modification of the oxidizable substances in the material to be treated in the reactor. In most cases, the amount of oxygen needed to decompose and/or modify the oxidizable substances is calculated on the basis of small-scale pilot or laboratory experiments on wet oxidation of the polluted material in question. Especially in those cases where the wet oxidation is combined with a biodegradation process, it is desirable that the oxygen is added in an amount which corresponds to or is in excess of the calculated amount of oxygen which is needed to decompose and/or modify the oxidizable substances so as to render the polluted material substantially biodegradable. In contrast, it is preferred that oxygen is added in excess of the calculated amount when the polluted material is solely subjected to wet oxidation. However, for most purposes, whether a subsequent biodegradation is performed or not, it is generally preferred to adapt the supply of the gas so that it is introduced in an amount corresponding to an oxygen amount of at least 100%, preferably an amount in the range of 105-200%, in particular about 110-160%, such as 110-130%, e.g. 110-120%, calculated on the COD value of the material to be treated.

The pressure of the oxygen-containing gas added to the reactor is to be suited to the overall pressure prevailing in the reactor. Thus, the pressure of the oxygen-containing gas should be at least as high as the pressure prevailing in the reactor, so as to ensure that the oxygen-containing gas may be distributed within the material in the reactor. To ensure that the amount of oxygen-containing gas is sufficient throughout the reactor, it may be introduced through several inlets which are located at different positions in the reactor so as to ensure a sufficient distribution of the oxygen-containing gas.

Examples of other suitable oxidizing agents are hydrogen peroxide, a percarbonate, a peroxodisulphate, a permanganate, a peracetate, hypochlorite, chlorine or ozone, optionally in combination with the oxygen-containing gas. The oxidizing agent (including any oxygen. containing gas) is preferably introduced in the abovementioned preferred total amount corresponding to an oxygen amount of at least 100%, preferably an amount in the range of 105-200%, in particular about 110-160%, such as 110-130%, e.g. 110-120%, calculated on the COD value of the material to be treated.

It is contemplated that certain types of suitable oxidizing agents may be prepared directly in connection with the wet oxidation reactor system. For instance, percarbonate compounds could be produced an electrolysis process carried out in an electrolysis system located in connection with the wet oxidation reactor system. The electrolysis system could optionally be driven by the energy produced by the wet oxidation process, and the percarbonate compounds produced could be introduced directly into the reactor. Such a system would be especially useful for the treatment of polluted materials which do not contain large amounts of substances to be oxidized, or which for other reasons do not consume large amounts of oxidizing agents. The system is contemplated to be especially useful for treating soil polluted with relatively low amounts of oxidizable substances.

For instance, when treating an alkaline suspension of soil containing high levels of inorganic cyanide, it has turned out that at least part of the cyanide content may be decomposed in the presence of an oxidizing agent such as potassium permanganate or diammonium peroxodisulphate at room temperature or slightly higher temperatures.

The oxidition conditions which are sufficient to decompose and/or modify the oxidizable substances typically comprise heating and pressurizing the suspension. Thus, according to the present invention, it is preferred that the wet oxidation is performed under conditions which comprise heating the suspension and subjecting it to a pressure which is at least sufficient to substantially prevent boiling of the liquid.

The temperature and pressure needed for obtaining sufficient decomposition and/or modification of the oxidizable substances will depend on the specific material to be treated, and cannot be generalized. Thus, in most cases, the temperatures necessary for the wet oxidation processes are determined by small-scale pilot plant or laboratory experiments on the polluted material to be treated. The pressure in the reactor also depend on the temperature therein and on the type of material to be treated. After leaving the heat exchanger of the reactor (the heating zone is explained below), the pressure on the material which has been treated therein is released by throttling in a relaxing pipe.

The material subjected to wet oxidation in the reactor is preferably first heated in a heating zone of the reactor to a temperature which is sufficient for initiating the decomposition and/or modification of oxidizable substances in the material; it is then maintained in a reaction zone of the reactor at a temperature at which the decomposition and/or modification proceeds, for a sufficient time to ensure that the decomposed and/or modified substances remaining after the wet oxidation and the optional removal of heavy metals are substantially biodegradable, and then cooled in a cooling zone of the reactor. Preferably, the heating zone comprises a heat transfer zone in which the polluted material entering into the system is heated by heat transfer with the effluent in the cooling zone of the tube reactor. The effluent, i.e. the wet-oxidized polluted material comprising decomposed and/or modified oxidizable substances is, in cases where the wet oxidation is carried out at elevated temperatures, at a high temperature. This effluent may therefore advantageously be used to heat the material which enters into the system. When the wet oxidation process which is to be carried out at elevated temperatures is initiated, it is, however, necessary to heat the polluted material by heat derived from an external heating system. As the wet oxidation reaction an is exothermic reaction, the oxidation may continue continuously after having been initiated, without the need for further heating, the heat of the effluent being in most cases sufficient to heat the polluted material entering into the system. As stated above, the polluted material is maintained in the reaction zone for sufficient time to secure that the desired degree of decomposition and/or modification of the oxidizable substances is obtained.

In some cases, it may prove advantageous to adjust the pH of the polluted material to be treated in the reactor so as to enhance the wet oxidation of the oxidizable substances therein. Thus, in these cases, a pH-regulating agent is preferably added to the suspension, the pH-regulating agent preferably being a base, e.g. an alkali metal hydroxide, carbonate or bicarbonate, or an alkaline earth metal hydroxide, carbonate or bicarbonate, or ammonia, or an organic base. When the polluted material to be treated is soil containing large amounts of chalk this pH-adjustment is, however, in most cases not necessary, as this type of soil is in itself sufficiently alkaline. pH-regulation is accordingly more important when the polluted material to be treated has a neutral or even acidic character. The amount in which the pH-regulating agent should be added will depend on the material to be treated as well as on the conditions under which the wet oxidation is to be performed.

In some cases, the effectiveness of the wet oxidation process may be improved by adding an oxidation catalyst which preferably comprises a manganese (IV) or cerium (IV) compound or a combination thereof. An addition of an oxidation catalyst is especially preferred in those cases, where the polluted material is subjected to several rounds of recycling in the wet oxidation system, as the catalyst may be difficult to recover from the wet oxidation treated material and consequently may be lost from the system when the wet oxidation treated material is removed.

The rate of decomposition and/or modification of oxidizable substances in the polluted material to be treated in the wet oxidation process is increased the more vigorous the reaction conditions are. Thus, as stated above, the flow in the plug flow reactor is preferably a turbulent flow, i.e. a flow having a Reynolds number of at least 4000. It is, however, preferred that the flow of the suspension in the reactor has a Reynolds number of at least 10,000, preferably at least 20,000, more preferably at last 30,000, and preferably at the most 100,000, more preferably at the most 80,000, most preferably at the most 60,000. (The Reynolds number is a parameter which is used as an indication of the flow conditions in question. The Reynolds number is a dimensionless quantity which is calculated from the diameter (D) of the tube, the velocity (V) of the material through the tube, the viscosity ($\eta$) and the density ($\rho$) of the material. Thus, Reynolds number may be expressed as $$D \times V \times \eta/\rho).$$

The flow of the suspension in the reactor is preferably adjusted to the viscosity and size of the particles of the suspension so that substantially no deposition of the polluted material will take place in the reactor. Preferably, the flow rate is in the range of 1.2-2.2 m/sec., such as 1.4-2 m/sec., more preferably in the ra 1.7-1.8 m/sec. The actual flow rate to be used is of course dependent on the dimensions of the tube reactor as well as on the desired extent of wet oxidation to be obtained and on the polluted material to be treated. In this regard, it may be noted that the capacity of the tube reactor is dependent on the diameter of the tube of the reactor. As there are practical limits to the diameter of the tube (often, a diameter of about 10 cm will be considered a practical maximum for a steel reactor), one way of increasing the capacity of the tube reactor is to construct the tube reactor of two or more tubes arranged in parallel. This results in an increased total flow capacity of the tube reactor and thus in the possibility of treating increased amounts of polluted material.

The wet oxidation conditions in the tube reactor are preferably adapted so that the holding time (reactor volume/flow rate) of the suspension in the reactor is such that the polluted material treated in the reactor becomes substantially biodegradable. The holding time which is required to obtain this substantial biodegradability is of course dependent on the nature of the polluted material and the oxidizable substances as well, as on the type, nature and tolerance of the subsequent biodegradation process. Thus, the required holding time will in most cases be determined on the basis of laboratory or pilot plant experiments performed on the polluted material to be treated.

In most cases, one passage of the suspension of the polluted material through the reactor will be sufficient to obtain the desired decomposition and/or modification of oxidizable substances. In some cases, however, it may be advantageous to subject the material to several passages through the reactor so as to obtain a sufficient degree of decomposition and/or modification of oxidizable substances. Also, a holding time which on the basis on laboratory or pilot plant experiments has been found to be sufficient for the wet oxidation treatment in question may be obtained by recirculating the suspension of the polluted material one or more times through the reactor. In most cases, it is preferred that the holding time under oxidizing conditions in the reactor is in the range of 5–60 min., e.g. 10–50 min., preferably 20–40 min. and most preferably about 30 min.

The kind of biodegradation process to which the decomposed and/or modified substances optionally are subjected is not critical to the method of the present invention.

As stated above, the reactor in which the wet oxidation is carried out is a reactor comprising a heating zone, a reaction zone and a cooling zone. When using rather vigorous oxidizing agents, it may be necessary that at least the reaction zone of the reactor is constructed of a material which is substantially resistant to the oxidizing agent.

As stated above, after initially supplying heat from an external source the suspension introduced into the reactor is heated using heat recovered by heat exchange. Accordingly, the heating zone of the reactor is preferably equipped with a heat exchanger system and/or a heating jacket system, the heat exchanger system preferably comprising at least part of the cooling zone of the reactor.

The wet oxidation treatment may in itself lead to substantially total decomposition of the polluted material. Thus, by the wet oxidation process, the oxidizable substances may be substantially decomposed to low molecular weight organic compounds, preferably organic compounds containing at the most 4 carbon atoms, preferably at the most 3, more preferably 2 carbon atoms or even 1 carbon atom, e.g. formic acid, acetic acid or carbondioxide. The conditions under which this substantially total decomposition cakes place will of course be dependent on the type of polluted material as well as the oxidizable substances therein. In most cases, however, it has been found that a substantially total decomposition may be obtained when the wet oxidation is performed in a reactor comprising a substantially horizontal tube or a number of substantially horizontal tube sections, the wet oxidation being performed at a temperature in the range of 150°–300° C., preferably 200°–260° C., more preferably 220°–260° C., still more preferably 230°–260° C., in particular 240°–260° C. in the presence of an oxidizing agent which is added through one or several inlets in an amount which is at least sufficient to and preferably in excess of the theoretical amount needed to decompose the oxidizable substance to the low molecular weight organic compounds. As stated above, the amount of oxygen needed may be calculated on the basis of laboratory or small-scale pilot plant experiments performed on the material in question. As mentioned above, in most cases, it is preferred that the polluted material to be treated is in the form of a suspension which is passed through the reactor in a substantially continuous turbulent flow, preferably a flow having a Reynolds number within the ranges stated above. In most cases, the wet oxidation process is advantageously combined with a biological degradation process. In such cases, the wet oxidation process is performed to such an extent that the decomposed and/or modified substances remaining after the wet oxidation are substantially biodegradable.

When the polluted material contains substances which are not oxidizable and thus not degraded by the wet oxidation, it may be necessary to remove these substances when these will not be tolerated by microorganisms in the biodegradation process. Examples of such substances which are not oxidizable and/or not biodegradable are heavy metals. Heavy metals may be solubilized by the wet oxidation treatment and thus be removed from the liquid phase resulting from the wet oxidation treatment. The heavy metals may be removed by precipitation, electrolysis or crystallization, but a preferred method involves liquid-liquid extraction. The manner in which the heavy metals are removed will of course depend on the nature of the heavy metals, as well as the amounts in which they are present and the specific biodegradation process to be employed.

Prior to the biodegradation, it may be necessary to separate material in the form of a suspension into a solid and a liquid phase so as to remove at least part of the solid material, which in most cases is more or less inert, from the suspension, as this solid material will not be further degraded by the biodegradation process and will in most cases only decrease the capacity of the biodegradation plant in question.

The biodegradation process which is to be used in accordance with the present invention preferably involves introducing the liquid phase resulting from the wet oxidation treatment into a biodegradation plant, e.g. an activated sludge plant, wherein the biodegradable substances in the liquid to be treated are degraded by microorganisms which are present in the activated sludge. A wide variety of microorganisms may be present, i.e. autotrophic as well as heterotrophic and aerobic, anaerobic or facultative bacteria, as well as lower euycarotic organisms such as protoza. The microorganisms utilize the nutrients present in the suspension or liquid to be treated. Thus, the microorganisms convert organic and inorganic matter to biomass under anaerobic, aerobic or anoxic conditions. Activated sludge may be recovered from various sources such as municipal purification plants, and depending on the microorganisms which are present in the activated sludge to be employed, it may be necessary to adjust the liquid or suspension to be treated so as to obtain optimal decomposition conditions. Generally, it is preferred that the pH value of the liquid or suspension to be treated is within the range of 6–9, as this range will be tolerated by most microorganisms. A pH range of 7–8 is however, in most cases preferred. Also, the temperature of the liquid or suspension to be treated should be adapted to the microbial composition of the activated sludge. Most microorganisms tolerate temperatures within the range of 10°–70° C., but optimal microbial growth is often obtained at temperatures in the range of 30°–40° C. or 55°–65° C. When subjecting the suspension to biodegradation directly subsequent to the wet oxidation treatment, the temperature which is desirable for the biodegradation to proceed is preferably obtained by allowing the effluent from the wet oxidation reactor to cool on its passage from the wet oxidation reactor to the biodegradation plant, optionally with an intermediate solid/liquid separation. In some cases, it may be advantageous to add further nutrients to the suspension or liquid to be treated in the biodegradation plant if these are deficient in certain essential or biodegradation-enhancing substances. In any case, the suspension or liquid to be treated should be adapted so as to obtain optimal growth conditions, i.e. a maximal specific growth rate for the microorganisms present in the activated sludge. These optimal conditions may be determined by preliminary experiments on a pilot or laboratory scale equipment.

In the activated sludge plant, the microorganisms are flocculate and the flocculated microorganisms are brought into contact with the liquid or suspension to be treated. The distribution of the flocculated microorganisms in the suspension is obtained by a means of aeration (in the cases of aerobic decomposition conditions), optionally in combination with stirring. When the microbial decomposition is terminated, the flocculated microorganisms are separated from the suspension, often by simply allowing the suspension to settle. At least part of the settled material which contains substantial amounts of flocculated microorganisms is recycled to the inlet of the activated sludge plant, wherein it is mixed with the liquid or suspension which is to be subjected to biodegradation. In some cases, it may be necessary to remove part of the biomass, i.e. the microorganisms produced as a result of the decomposition, from the biodegradation plant. This material, which substantially has been freed from hazardous or toxic substances by the preceding wet oxidation treatment, is subjected to filtration and is deposited in any convenient manner.

The degree to which it is economical to degrade or modify the toxicity of substances in the material treated towards microbes will often depend on the most inhibiting substance in the material. After the wet oxidation, the treated material is, as explained above, normally subjected to a biological degradation. As will be explained in the following, the extent to which the wet oxidation is performed is preferably adapted so that the treated material is suitable for the biological degradation, i.e. the wet oxidation is normally not carried out to any extent beyond that which results in a material, which can be degraded by the biological degradation treatment as such further wet oxidation treatment would hardly be economical, except in cases where the energy recovery in the wet oxidation process is a positive energy recovery of considerable extent. This, however, especially being a possibility in the case of sludge treatment.

The extent to which the wet oxidation should decompose and/or modify the oxidizable substances in a particular material to adapt the treated material to a particular biodegradation process can be easily determined by preliminary experiments in pilot or laboratory equipment.

If the treated material contains any appreciable amounts of solid insoluble inorganic materials, these are preferably removed prior to the biological treatment. Thus, treated sewage is normally passed directly to a biological treatment, whereas treated soil suspensions will of course have to be subjected to solid/liquid separation and the liquid phase subjected to the biological degradation. It is interesting to note that in the case of a treated soil suspension, the solid inorganic material (often sand) separated from the liquid is normally a sterile free-flowing powder which may be utilized for various purposes, such as filler material for cement and concrete materials, road building, etc., or as a sterile soil component in artificial soil. In the case of sludge treatment, it is also desired to perform a solid liquid separation prior to the biological degradation.

In connection with particularly sludge, but also soil suspension, it is to be noted that the wet oxidation results in a greatly enhanced separability such as filterability of the treated material. While, e.g., normal sludge can only with great difficulty be filtered, the wet oxidation treated sludge can be easily separated in a liquid phase and a solid phase. The solid phase may be separated in a usual filter press and as a consequence of the enhanced separability of the phases, filter cakes with a very high dry matter content may be obtained. The filter cake or otherwise concentrated solid may be disposed of by conventional means such as incineration or distribution on fields.

The invention is further illustrated in the drawing, in which

Figure 2:
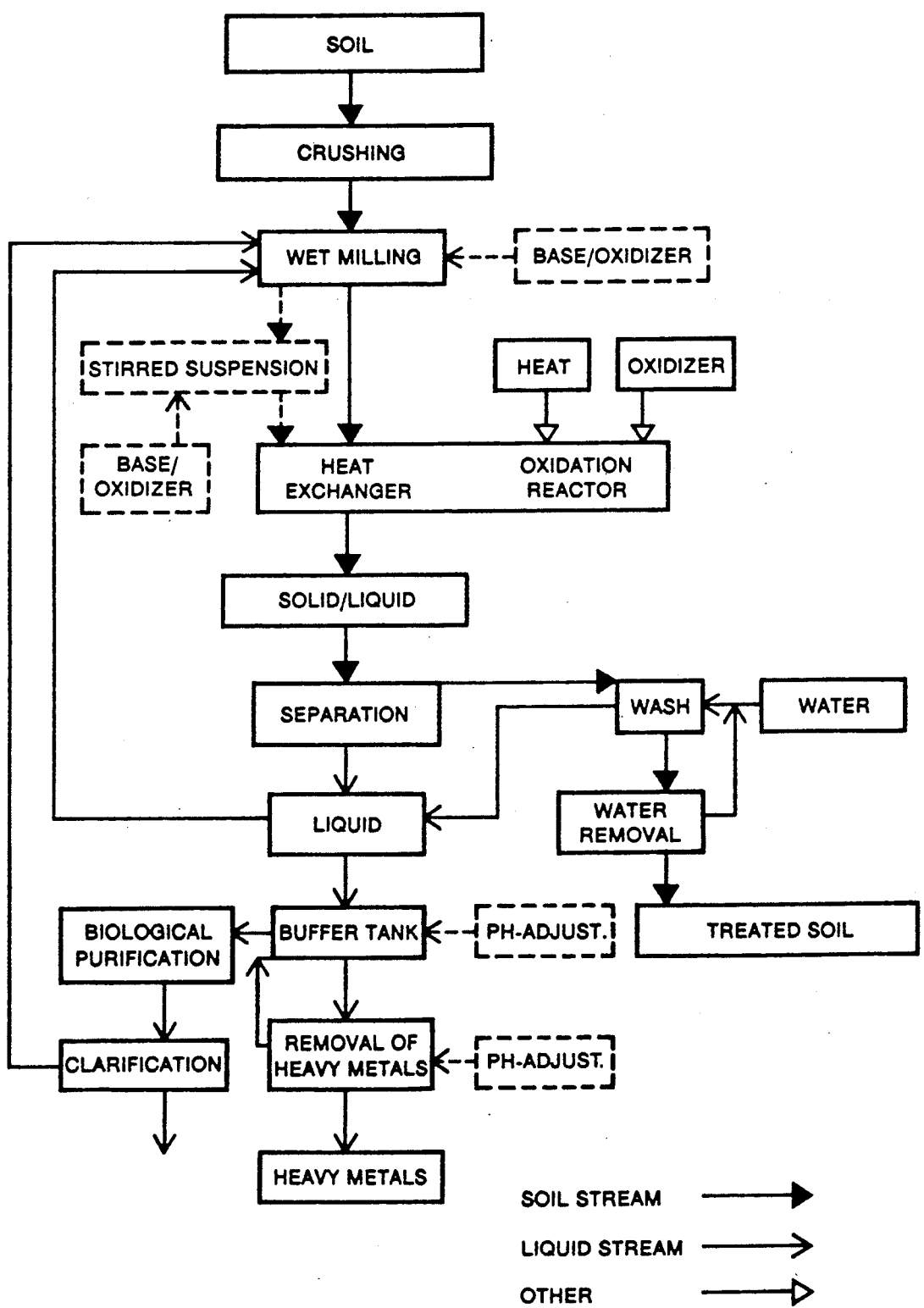
Figure 3:
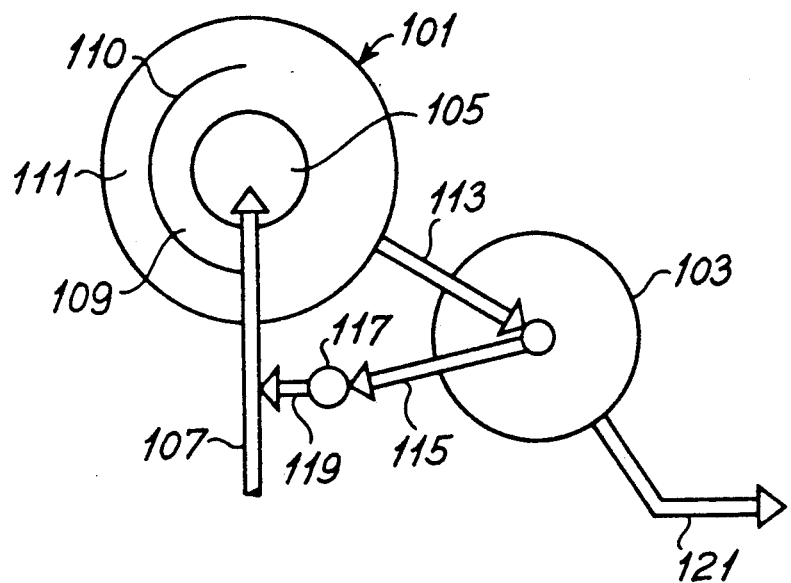
Figure 4:
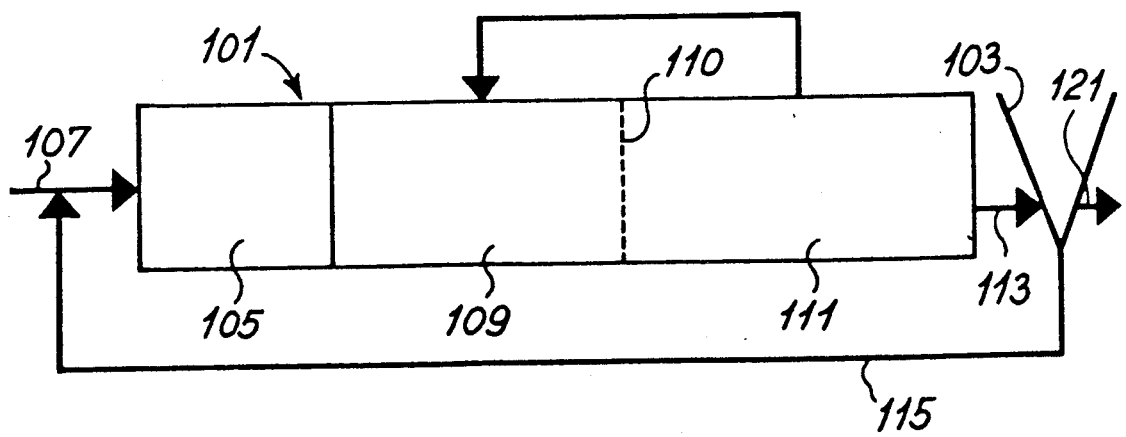

FIG. 1 is a schematic drawing of a system which is suitable for wet oxidation treatment, FIG. 2 is a flow diagram of a combined wet oxidation and biological degradation treatment, FIG. 3 is a schematic view of a biodegradation plant, and FIG. 4 is a diagrammatic view illustrating the principles of a one suitable biodegradation method.

FIG. 1 is a schematic drawing of a system (1) which is suitable for the wet oxidation treatment of polluted material according to the present invention. The system (1) may be employed for the wet oxidation treatment of polluted material which initially is in either solid or liquid form. In those cases where the polluted material to be treated is solid material containing particles of a size greater than 10 mm, the initial stages of the process are as follows:

The solid material is loaded into a feed-hopper (3) from which the material is transported via a conveyor belt (5) to a jaw crusher (7). The jaw crusher (7) crushes to a particle size of 0–50 mm. The crushed material is transported via a conveyor belt (11) to a vibrating sieve (15). Material of particle size 0–10 mm is transported from the bottom of the vibrating sieve via a conveyor belt (17) to the top of a storage silo (19).

Particles of size >10 mm are transported from the vibrating sieve (15) via a conveyor belt (13) to a cone crusher (9), where they are crushed and returned via the conveyor belt (11) to the vibrating sieve (15).

Polluted material having from the start a maximum particle size of 10 mm can be loaded directly into the storage silo (19).

Material from the storage silo (19) is transported via a cup-elevator (21) to a silo (23). Material is withdrawn from the bottom of the silo with the aid of a belt weigher (not shown) and delivered via a conveyor belt weigher (25) to the inlet funnel of a ball mill (29). Liquid, in the form of liquid phase resulting from the wet oxidation process and subsequent solid/liquid separation, or in the form of fresh water, or in the form of a combination of these, is delivered from a reservoir (33) to the ball mill (29). After wet-milling, the resulting slurry is pumped by means of a slurry pump (31) to a hydrocyclone (27). in which the liquid slurry is divided into two streams. The fine stream is sent to a stirring tank (35) equipped with a lid and, if necessary, an air-exhauster. The coarse stream is returned to the ball mill.

The suspension is led from the stirring tank (35) to a centrifugal pump (37) which pumps it to a piston membrane pump (43), and the piston membrane pump brings the suspension up to the required pressure.

Polluted material in the form of liquid or sludge may be loaded directly into the stirring tank (35). The suspension is heated to the desired treatment temperature in the first part of a reactor (47) and the required amount of oxygen is added. The suspension is then treated at the temperature and oxygen pressure in question, and the treated suspension is then cooled in a heat exchanger (not shown). The pressure on the suspension is then released by throttling in a relaxation pipe (not shown). The suspension is then led to a collecting tank equipped with stirrer (49).

The suspension from the collecting tank (49) is pumped to a belt filter (53) where a spreader system ensures spreading of the suspension stream over the whole width of the filter belt, thereby ensuring that the filter-cake is of uniform thickness.

The liquid filtered from the suspension on the belt filter is led to a liquid tank (63). The liquid is led from this liquid tank, via a system of storage tanks (83), back to the reservoir (33) or to ion. exchange columns (85, 87 and 89) in both cases for re-use. Alternatively, the liquid is withdrawn from the bottom of the liquid tank (63) and led to a storage tank (67); the liquid from the storage tank is then treated further (precipitation) in a precipitation tank equipped with stirrer (71).

The filter-cake is subjected to counter-current washing and the spent washing water is then led back to the reservoir (33). An extra thorough washing of the filter-cake is made possible by resuspending the material in a resuspension tank (57). The run-off is removed in a thickener (59) and is led to the precipitation tank (71). The material is then led to a belt filter (61) for final filtration.

In the precipitation tank (71), inorganic components are precipitated by addition of chemicals. After allowing it to settle, the precipitated material is withdrawn from the bottom of the precipitation tank, while the liquid phase is sent, via a second precipitation tank (73), back to the reservoir (33). Alkali can be added to the liquid in the precipitation tank (73) from a storage tank (69) in which alkali is mixed.

Liquid containing dissolved metals in amounts which render precipitation impracticable can be freed of dissolved metal by ion. exchange. The liquid is pumped to the ion-exchange plant (85, 87, 89). Two columns are run in series, so that the capacity of the first column can be fully exploited. The procedure is then changed so that the free column becomes the last in a series, and so forth. The free column is subjected to an elution programmed so that it is ready for recharging.

The metal-free liquid is then returned to the reservoir (33).

FIG. 2 is a flow diagram which illustrates one example of a method for carrying out the combined wet oxidation and subsequent biological purification processes in cases where the material to be treated is polluted soil such as discussed in the present application.

FIG. 3 is a schematic view of a biodegradation plant in which the biodegradation process according to the method of the present invention may suitably be performed. The biodegradation plant in FIG. 3 is a so-called OCO purifying plant which is in the form of a one-step active sludge plant wherein organic substances as well as nitrogen-containing substances are decomposed without the need for adding decomposing chemicals. The plant consists of a circular aeration tank (101) which is divided into three volume zones, and a clearing tank (103) wherein the treated material is separated into a solid and a liquid phase. The material resulting from the wet oxidation, either in the form of a suspension or in a liquid form which optionally has been obtained by subjecting the effluent (the wet oxidation treated material) from the reactor to separation into a solid and a substantially liquid phase, is introduced into a central part (105) of the aeration tank (101) through an inlet (107). The liquid to be subjected to biological degradation is then subjected to degradation in a zone (109) and zone (111) of the aeration tank. The zone (109) and the zone (111) are separated by a partition (110) in which a number of diffusers are positioned. Further, the aeration tank is equipped with stirring means in each of the zones (105), (109) and (111) of the aeration tank (101), and the stirring provides a horizontal movement of the liquid in each of the zones (105), (109) and (111). Only in zones (109) and (111) of the aeration tank (101) is the liquid subjected to aeration; in zone (101) anaerobic conditions prevail. The liquid material subjected to biodegradation, which is contained in zones (109) and (111) of the aeration tank (101), is subjected to a certain degree of mixing which will be discussed in detail below in the explanation of FIG. 4. The material from the aeration tank is transferred to the clearing tank (103) through a tube (113). In the clearing tank (103), the treated material is separated into a liquid and a solid phase, the separation being performed by allowing the solid part of the treated material to settle. The settled solid phase, which is in the form of sludge, is then transferred to the aeration tank for another biological degradation treatment. The sludge is passed through a tube (115) to a sludge pumping well (117) and further through a tube (119) to the inlet (107). The biologically degraded liquid phase from the clearing tank (103) is removed from the plant through an outlet (121), e.g. directly into the environment, as the water by the biological degradation leads to a degree of purity sufficient for this purpose.

FIG. 4 is a diagrammatic view of the principles of the OCO process as it is carried out in the aeration tank (101). The material to be treated is introduced into the reaction zone (105) of the aeration tank (101). Anaerobic conditions prevail in the zone (105), and substantially no oxygen or nitrate is present in this zone. In the zone (105) anaerobic degradation of the material to be degraded is carried out. From the anaerobic zone (105), the material is passed to the zone (109) wherein anoxic conditions prevail. Anoxic conditions comprise conditions where nitrate is present and oxygen is absent. Thus, in the anoxic zone (109), the nitrogen of the nitrate compounds is converted to the gaseous nitrogen, as the microorganisms of the active sludge utilize the nitrate as an oxidizing agent when no oxygen is present. Between the zones (109) and (111), a certain degree of mixing of the substances takes place. Aerobic conditions prevail in zone (111), i.e. conditions where oxygen is present in the water. Under the aerobic conditions the organic matter in the material to be treated is oxidized and converted to carbon dioxide and water. Further, ammonia and organic nitrogen are converted to nitrate compounds. Part of the organic matter present in the material is used in production of microorganisms. As explained above in connection with FIG. 3, a certain degree of mixing takes place between the zones (109) and (111) of the aeration tank (101). This mixing is performed by varying the means of stirring of zones (109) and (111). The degree of mixing is determined by the composition of the material to be treated, i.e. to ensure that a sufficient decomposition of the material is obtained. The partition (110) ensures that the flow in zones (109) and (111) are independent of each other and that controllable mixing of the two zones can take place in the part of the aeration tank where no partition is present.

EQUIPMENT AND REACTION CONDITIONS USED IN THE EXAMPLES

The experiments were performed in a pilot autoclave (*loop-autoclave) made of acid resistant steel of the type UBH24, available from Avesta, Sweden, and consisting of a steel container in the form of a cylinder having an inner diameter of about 11 cm and a height of 18 cm, and an externally placed 160 cm long steel tube with an inner diameter of 22 mm forming a closed loop. One end of the tube was welded to the outside of the bottom of the container, and the other end was welded to the outside of the lower part of the side of the container. In the bottom of the container, just above the tube connection, a centrifugal pump wheel was placed which created the flow of the suspension to be treated through the closed autoclave system comprising the tube and the cylinder. The pump wheel was driven by an electric motor wia a magnetic coupling, the electric motor being placed outside the autoclave. The top of the container was constituted by a lid which was closed by a flange assembly. The lid was equipped with an inlet valve for molecular oxygen. The suspension to be treated in the autoclave was added to the container by removing the lid and simply pouring the suspension into the container. The treated suspension was withdrawn from the autoclave by means of a vacuum pump. The volume of the suspension in each of the following examples was about half of the total volume of the autoclave. The remaining free volume of the autoclave was filled with oxygen.

The initial oxygen pressures employed are specified in the individual examples below. The autoclave itself was not equipped with a pressure gauge.

The autoclave was constructed so as to obtain reaction conditions in the tube very similar to plug flow conditions. When pure water was circulated in the autoclave by means of the pump, the flow rate was about 1 liter/sec., resulting in a Reynolds number of about 30,000: As the viscosity of the suspensions in some of the following examples is dependent on the types of components present in the suspensions, the flow rate and the Reynolds number may differ from those of pure water. It has not been possible to measure to exact flow rate of the suspensions used in the examples as such measurements would disturb the reaction, but it was evident that the flow was turbulent, i.e. of a Reynolds number well in excess of 4,000.

The autoclave was heated by being dipped in a thermostatted melted salt bath and cooled by being dipped in cold water. With respect to heating, the desired temperature was reached within about 5 min. and with respect to cooling, the temperature was reached in about 2 min.

The autoclave temperature employed in the heating phase and the duration of heating are specified in the individual examples below.

EXAMPLE 1

Autoclave treatment of industrial waste water from an organic chemical synthesis plant 1.1. Object The main objective was to remove primary aromatic amine (PAA), at the same time reducing the amount of organic material expressed in terms of COD. When the amine had been removed the remaining material could be subjected to biological purification.

1.2. The starting material

An almost clear, slightly yellowish liquid which was reported to contain:
PAA (sulphanilic acid)—approx. 2160 mg/l
COD—approx. 8620 mg/l 1.3. Experimental conditions and results Procedure: The oxygen pressure corresponding to 100% oxidative degradation was calculated on the basis of the reported COD value. The loop-autoclave was half filled with liquid; in this case 6 bar $O_2$ in a gas volume of 960 ml corresponds to 8340 mg $O_2$ Per liter at room temperature. 6.2 bar should then correspond to 8620 mg/l. A pressure of 12 bar $O_2$ was normally used, but an experiment using 6 bar and another using 18 bar $O_2$ were also carried out. Temperatures of 160° C., 200° C. and 240° C. were maintained for 10 min. or 25 min.

Table 1a summarizes the treatment conditions and the resulting values for COD, PAA and pH.

Results: the results are summarized in Table 1a.

TABLE 1a

| Expt. | Treatment | COD mg/l | PAA mg/l | pH |
|---|---|---|---|---|
| | None (starting mat.) | 10000 | 2100 | 4.20 |
| 1 | 160° C., 10 min., 12 atm. $O_2$ | 8800 | 1700 | 4.19 |
| 2 | —, 25 min., — | 6400 | 1100 | 4.08 |
| 3 | 200° C., 10 min., — | 7900 | 1000 | 4.00 |
| 4 | —, 25 min., — | 6500 | 620 | 4.05 |
| 5 | —, —, 6 atm | 6500 | 785 | 4.06 |
| 6 | —, —, 18 atm | 6500 | 530 | 4.08 |
| 7 | 240° C., 10 min., 12 atm | 6000 | 620 | 4.25 |
| 8 | —, 25 min., — | 5600 | 370 | 4.45 |

Remarks: treatment at 160° C. for 10 min. resulted in a very dark brown color and a smell resembling that of caramel. A higher temperatures and with longer duration of treatment the color paled until it could be characterized as slightly olive-green. The smell also became more like that of aldehydes or ketones. After treatment at 240° C., both for 10 min. and for 25 min., the smell of HCN was detectable (its presence was also demonstrated using a Dräger tube).

1.3.2. Experimental series 1.2

Procedure: Since it is probable that oxidative degradation is enhanced in a basic medium, $Na_2CO_3$, KOH or $Ca(OH)_2$ were added. Cu was also added in two of the experiments since it has been reported to have a catalytic effect.

240° C., 25 min. and 12 atm $O_2$ were the conditions generally employed. 40 g $Na_2CO_3$ +3.6 g KOH were added in Experiments 9, 10 and 11. In Experiment 10, 107 mg of $Cu^{2+}$ were added in the form of $NH_3$ complex. In Experiment 11, 600 mg of Cu were added as metal powder. In Experiment 12, 32 g of $Ca(OH)_2$ were added and nothing else.

Results: the results are shown in Table 1b.

TABLE 1b

| Expt. | COD mg/l | PAA mg/l | pH | Cu ppm |
|---|---|---|---|---|
| 9 | 3200 | 6 | 9.47 | — |
| 10 | 7400 | 100 | 9.07 | 47 |
| 11 | 6900 | 50 | 9.11 | 56 |
| 12 | 6400 | 12 | 12.40 | — |

Remarks: all the above Experiments were conducted at 240° C. for 25 min. at 12 atm $O_2$. In Experiments 9, 10 and 11, the pH before autoclave treatment was 10.2. The color in the absence of Cu was intensely yellow. In the presence of copper it was slightly brownish. All the treated samples smelled strongly of NH$_3$, but not of HCN.

1.3.3. Experimental series 1.3.

Procedure: 20 g of Na$_2$CO$_3$ were used in Experiment 13, and 20 g of Na$_2$CO$_3$ +2.6 g of NaOH were used in Experiment 14. Since the results were considerably poorer after the addition of Cu, an attempt was made to reproduce Experiment 9 (see Experiment 15 below). However, it was not possible to reproduce the results of Experiment 9, possibly owing to the presence of some Cu remaining in the autoclave. The autoclave was therefore cleaned thoroughly with 1.5 l of dilute HN0$_3$, which dissolved 125 mg of Cu. 400 g of quartz powder +800 ml of water were then circulated for 1 hour, after which the autoclave was rinsed and Experiment 9 was repeated (see Experiment 16 below).

Results: the results are shown in Table 1c.

TABLE 1c

| Expt. | COD mg/l | PAA mg/l | pH |
|---|---|---|---|
| 13 | 6100 | 235 | 9.00–7.95 |
| 14 | 7300 | 136 | 9.55–8.68 |
| 15 | 6000 | 21 | 10.2 |
| 16 | 4800 | 10 | 9.70 |

Remarks: all the above Experiments were conducted at 240° C. for 25 min. at 12 atm O$_2$.

1.3.4. Experimental series 1.4

Procedure: 1) Two experiments were carried out at temperatures higher than 240° C.; 2) Experiment 9 was repeated after thorough cleaning of the autoclave as described above; 3) three experiments were carried out using smaller amounts of Ca(OH)$_2$ than in Experiment 12.

Results: the results are shown in Table 1d.

TABLE 1d

| Expt. | COD mg/l | PAA mg/l | pH |
|---|---|---|---|
| 17 | 4800 | 425 | 4.55 |
| 18 | 3700 | 22 | 5.51 |
| 19 | 5600 | 11 | 9.49 |
| 20 | 5700 | 9 | 12.61 |
| 21 | 6000 | 17 | 12.1 |
| 22 | 6100 | 82 | 9.8 |

Remarks:

Experiment 18 was carried out at 280° C. for 20 min. at 12 atm.

Experiment 19 was a repetition of Experiment 9.

Experiment 20 was carried out as for Experiment 12, but with only 20 g of Ca(OH)2

Experiment 21 was carried out as for Experiment 12, but with only 10 g of Ca(OH)2.

Experiment 22 was carried out as for Experiment 12, but with only 5 g of Ca(OH)$_2$.

A leak occurred during Experiment 17 when the temperature reached 264° C.; the autoclave was therefore cooled immediately. The smell of HCN, which was apparent after treatment at 240° C., was now very weak.

1.4 Biodegradability of organic material present in the waste water after autoclave treatment Procedure: the effect of a representative selection of eight samples of waste water which had been treated in the loop autoclave (as specified in section 1.3. above) on the respiration (O$_2$ consumption rate) of the microorganisms present in a typical active sludge used in biological purification plants was investigated.

50 ml samples of autoclave treated waste water were adjusted to pH 7.0 by the addition of 2 M CH3COOH or 1 M NaOH (depending on whether or not base had been added to the waste water prior to the oxidation treatment in the loop autoclave), and 230 ml of the forcibly aerated active sludge was added to each sample in a container which could be closed to the atmosphere.

50 ml of a glucose solution with a COD value equal to that of the autoclave treated waste water sample in question was used as control in each case.

After mixing the active sludge and the sample or control, the container was closed to the atmosphere. Respiration, expressed as mg O$_2$ per liter per min., was monitored, using a WTW O$_2$ electrode placed in the container, over a period of 5–20 min. (depending on the rate of O$_2$ consumption).

Results: the results are summarized in Table 1e.

TABLE 1e

| Sample Expt. No.* | Treatment conditions* | | | COD* | PAA* | I.F.*** |
| | Temp./°C. | time/min. | % O$_2$** | | | |
|---|---|---|---|---|---|---|
| 1 | 160 | 10 | 200 | 8800 | 1700 | 0.10 |
| 3 | 200 | 10 | 200 | 7900 | 1000 | 0.48 |
| 6 | 200 | 25 | 300 | 6500 | 530 | 0.17 |
| 11 | 240 | 25 | 200 | 6900 | 50 | 0.16 |
| 12 | 240 | 25 | 200 | 6400 | 12 | 1.0–1.1 |
| 18 | 280 | 20 | 200 | 3700 | 22 | 0.02 |
| 19 | 240 | 25 | 200 | 5600 | 11 | 0.48 |
| 22 | 240 | 25 | 200 | 6100 | 82 | 0.67 |

*See Tables 1a, 1b and 1d in section 1.3.
**Amount of oxygen employed. A value of 100% corresponds to the required amount calculated on the basis of the COD-value for the untreated waste water.
***Inhibition factor (I.F.) is defined as:
respiration with sample
respiration with control Remarks: As described in section 1.3., Cu and base had been added to sample 11, and bases alone to samples 12, 18 and 22.

The results appear to indicate that the inhibition factor (I.F.) increases both with decreasing duration of treatment at a given temperature, and with decreasing temperature for a given duration of treatment in the loop-autoclave.

Although PAA itself is expected to exert a bactericidal effect, the relatively high PAA concentrations in the autoclave-treated samples do not appear to lead to dramatic inhibition of respiration.

Conclusion: Wet oxidation of PAA-containing waste water using short holding times and relatively low temperatures leads to a liquid which can be satisfactorily biodegraded.

EXAMPLE 2

Autoclave treatment of sewage sludge from a municipal purification plant.

2.1 Object

To produce a sterile, odorless product from which it is easy to drain off the water.

2.2. The starting material

Thick, dark grey brown, malodorous sludge from a Danish municipal purification plant.

2.3. Experimental conditions and results 2.3.1. Autoclave experiments

Procedure: the sludge was subjected to wet oxidation at three chosen temperatures, 130° C., 165° C. and 200° C. An anaerobic experiment was also carried out for comparison (pure $N_2$). It was considered feasible to treat the sludge in an undiluted condition. The autoclave was half filled (960 ml). The COD value was reported as being approx. 40000 mg $O_2$/l, corresponding to approx. 30 atm $O_2$ in the gas phase. A pressure of 30 atm $O_2$ was therefore employed in all the experiments with the exception of the anaerobic experiment, where the free gas volume of the autoclave was flushed three times with $N_2$. The various temperatures were maintained for 10 and 25 min., respectively. The heating and cooling phases were as for the experiments with industrial waste water (Example 1).

Results: the results are shown in Table 2a.

TABLE 2a

| Expt. | $N_2$ | $O_2$(atm) | Temp. | Time |
|---|---|---|---|---|
| 1 | anaerobic | — | 160° C. | 25 min. |
| 2 | — | 30 | 130° C. | 10 min |
| 3 | — | 30 | — | 25 min. |
| 4 | — | 30 | 165° C. | 10 min. |
| 5 | — | 30 | — | 25 min. |
| 6 | — | 30 | 200° C. | 10 min |
| 7 | — | 30 | — | 25 min. |

After treatment the dry-matter content, ignition residue, COD, BOD and pH were determined. It was qualitatively apparent that the treated sludge was lighter in color, sedimented better, and that the smell decreased with increasing temperature of the oxidative treatment. After treatment at 200° C. the smell had almost disappeared, whereas after the anaerobic treatment at 165° C. it seemed to be even worse than before treatment. The results are shown in Table 2b.

TABLE 2b

| Expt. No. | Dry matter g/kg | Ignition residue g/kg | Loss on ignition g/kg | COD mg/l | BOD mg/l | pH |
|---|---|---|---|---|---|---|
| 1 | 41.0 | 12.0 | 29.0 | 46900 | 7000 | 5.7 |
| 2 | 35.8 | 13.1 | 22.7 | 45100 | 8500 | 5.4 |
| 3 | 46.6 | 13.9 | 32.7 | 47200 | 7500 | 5.1 |
| 4 | 41.9 | 11.9 | 30.0 | 45600 | 11600 | 4.4 |
| 5 | 42.3 | 13.0 | 29.3 | 44100 | 10400 | 3.9 |
| 6 | 30.2 | 9.4 | 20.8 | 30800 | 8700 | 4.0 |
| 7 | 22.6 | 8.0 | 14.6 | 25000 | 9500 | 4.5 |
| Untreated sludge | | | | | 53500 | |

It is clear from the results in Tables 2a and 2b that a significant reduction in COD occurred above 165° C. In the case of BOD there was an increase at 165° C. (but not in the anaerobic experiment), which must be ascribed to an increase in the biological degradability after the oxidative treatment.

2.4 Biodegradability of organic material in the autoclave-treated sludge

Procedure: The effect of four samples of sewage sludge which had been treated in the loop-autoclave (as specified in section 2.3.1. above) on the respiration of the microorganisms present in the active sludge (see Example 1, section 1.4) was investigated. 50 ml samples of treated sewage sludge were used, and the procedure was otherwise as described in Example 1, section 1.4.

Results: The results are summarized in Table 2c.

TABLE 2c

| Sample Expt. No. | Treatment conditions* | | | I.F.** |
|---|---|---|---|---|
| | Temp./°C. | time/min. | $O_2$-pressure/atm. | |
| 4 | 165 | 10 | 30 | 1.43 |
| 5 | 165 | 25 | 30 | 1.0 |
| 6 | 200 | 10 | 30 | 0.53 |
| 7 | 200 | 25 | 30 | 0.67 |

*See Table 2a
**Defined as in Example 1, Table 1e.

Remarks: The results clearly indicate that a treatment temperature of 165° C. leads to significantly better inhibition results than a temperature of 200° C., and that the shorter treatment time also leads to inhibition results which are comparable to or better than those obtained following the longer treatment time.

Conclusion: Wet oxidation of sewage sludge using short holding times and relatively low temperatures leads to a material which can be readily biodegraded.

EXAMPLE 3

Autoclave treatment of soil from the site of a chemical plant producing insectides.

3.1.Object

The object was to destroy DDT, 4-chloro-2-methylphenol(in the following abbreviated as chlorocresol), and parathion which had accumulated in the soil as a result of previous industrial activity.

3.2.The soil material

Soil samples were taken, using an earth auger from two localities on the site where pollution should, according to a previous investigation, have been considerable. The samples, denoted A and B in the following, were divided into lengths of about 1 m. The material was mostly stiff, chalky clay containing an appreciable quantity of stones. The material near the surface also contained gravel, presumably added artificially.

3.2.1.Initial experiments

The samples were dried at 105° C., crushed, and sieved in order to remove stones and gravel of size >0.75 mm. A 40 g sample was subjected to Soxhlet extraction with 150 ml of acetone/hexane (80:20 v/v). The volume of the extract was reduced to 25 ml by evaporation. and it was then transferred quantitatively to a separating funnel by rinsing first with 100 ml of water and then with 50 ml of dichloromethane. After shaking, separating the phases and extracting with a further 50 ml of dichloromethane, the combined dichloromethane phases were dried with anhydrous $Na_2SO_4$, evaporated to dryness, and the residue was dissolved in hexane for quantitative analysis by gas chromatography.

Analyses were carried out for the above-mentioned three characteristic compounds. viz. 1) DDT, 2) chlorocresol and 3) parathion. However, no clear evidence for the presence of any of these was obtained; even though modifications in the analysis technique would probably lead to better results, the amounts of the compounds were so close to the detection limit that it would be difficult to determine to what extent they were removed by the autoclave treatment. It was therefore decided to artificially increase the sample content of each of these compounds individually.

3 3. Experimental conditions and results 3.3.1. Experiments with DDT

Procedure: To 80 g of dried soil sample was added a solution of 0.36 mg of DDT in sufficient ethanol to moisten the entire sample (ca. 20 ml). The sample was then dried at 105° C. Since it was later found that DDT is converted to DDE at this temperature, sample drying in subsequent experiments was carried out at room temperature in vacuum.

The wet oxidation (autoclave treatment) was carried out in the above-described loop autoclave. A suspension of 80 g of DDT. enriched sample in 1 liter of water was heated to 280° C. for 25 min under an initial oxygen pressure of 6 bar (it was originally planned also to try temperatures of 200° C. and 240° C. but since decomposition of DDT at 280° C. was inadequate this was regarded as a waste of time).

After the autoclave treatment the suspension was filtered. The filter-cake was dried at room temperature in vacuum and a 40 g sample was subjected to Soxhlet extraction as in the initial experiments.

Results: After drying at 105° C., a large proportion of the DDT was found to have been converted to DDE [1,1.bis(4.chlorophenyl).2,2-dichloroethene]. This is presumably due to reaction with (CaC03) present in the soil sample: the conversion of DDT to DDE involves the release of HCl (1 mol per mol) which would react readily with chalk.

On drying at room temperature instead of 105° C. no DDE was found; however, a large proportion of the added DDT could not be accounted for. After autoclave treatment at 280 C all DDT was converted to DDE the amount of DDE found corresponded to the DDT content ©f the starting material. No other conversion products could be identified with certainty, and DDT was not detected in the filtrate.

3.3.2. Experiments with chlorocresol

Procedure: Using the procedure described for DDT (section 3.3.1., above), chlorocresol was virtually undetectable; this is due to the volatility of the compound and its solubility in water. The method was then modified as described in the following, after which satisfactory results were obtained.

Two samples, one with a high content of clay (A, 2.0–3.0 m) and one with a higher content of gravel (B, 0.1–0.5 m) were wet-sieved (mesh size 0.75 mm) and suspended in water (1 liter of water per 100 g of soil sample). An ethanolic solution of chlorocresol (0.72 mg in 4 ml per 100 g of soil sample) was then added to each suspension, and a portion of each of the resulting mixtures was allowed to stand at room temperature. Other portions (100 g soil sample in 1 liter of water) were treated in the autoclave at 200° C., 240° C. and 275° C., respectively, for 25 min. under an initial oxygen pressure of 6 bar.

The pH of the various portions was adjusted to 4.5 with 6 M HCl, and they were then filtered through a Buchner funnel. The filtrate (D) was kept for subsequent analysis.

Instead of drying the moist filter-cake (C) it was Soxhlet extracted with 150 ml of acetone/dichloromethane (80:20 v/v); the weight of the sample was determined afterwards. The extract was concentrated to a volume of 25 ml by evaporation, and transferred quantitatively to a separating funnel by rinsing first with 100 ml of water and then with 50 ml of dichloromethane. After shaking, separating the phases and extracting with a further 50 ml of dichloromethane, a known amount of 4.chlorophenyl was added as an internal standard to the combined dichloromethane phases, which were then dried with $CaCl_2$. After concentrating the solution to 1 ml by evaporation, the sample was silylated with 1 ml of the following reagent:

5 ml of pyridine, 1 ml of hexamethyldisilazane and 0.5 ml of trimethylchlorosilane.

The sample was kept in an oil-bath at 80° C. for 30 min. and then analyzed by GCMS. measurements being made for two ions which are characteristic for 4-chlorophenyl and chlorocresol, respectively.

A solution of 200 $\mu$l of 4.chlorophenyl in hexane was added to the filtrate (D), which was then allowed to stand overnight. It was then made alkaline with NaOH and the resulting precipitate (consisting in part of $CaCO_3$) was allowed to settle. The liquid phase was transferred to a separating funnel by decantation and washed with dichloromethane. After separation, the dichloromethane phase was discarded. The aqueous phase was acidified and reshaken with dichloromethane; the analysis procedure was then as described above for the filter-cake (C).

Results. Chlorophenols are degraded extensively by wet oxidation, the largest fragments being $CH_3COOH$ and HCl. It was therefore regarded as sufficient to analyze for possible remaining chlorocresol. The amounts found (in per cent of the added amounts) are shown in Table 3a.

TABLE 3a

| | Chlorocresol/% | |
|---|---|---|
| | Filter-cake (C) | Filtrate (D) |
| Untreated | 10/10* | 90/90* |
| 200° C. | ≈0 | 33/21* |
| 240° C. | 0 | 0 |
| 275° C. | 0 | 0 |

*Samples B/A 3.3.3 Experiments with narathion

Procedure: As for chlorocresol, suspensions of ca. 100 g of soil sample A in 1 liter of water were each treated with 4 ml of a solution of parathion in hexane (180 mg/l). Since parath expected to be easily degraded, autoclave treatment was first carried out at 200° C. for 25 min. under an initial oxygen pressure of 6 bar; in subsequent experiments temperatures of 240° C. and 280° C. were also employed. The suspensions were filtered directly, and the filter-cake and filtrate were treated in the same way as described for chlorocresol.

Results: The p-nitrophenol moiety of parathion contributes about half of the molecular weight. The addition of 0.72 mg of parathion to 1 liter can therefore give rise to a maximum of ca. 0.36 ppm of p. nitrophenol. The solubility of p-nitrophenol resembles that of chlorocresol, and the compound was therefore sought in the filtrate. The analysis was performed using liquid chromatography and identification by UV spectrophotometry. The results are shown in Table 3b.

TABLE 3b

| | ppm | | | |
|---|---|---|---|---|
| | Untreated | 200° C. | 240° C. | 280° C. |
| Parathion | 0.45 | 0 | 0 | 0 |

TABLE 3b-continued

| | ppm | | | |
|---|---|---|---|---|
| | Untreated | 200° C. | 240° C. | 280° C. |
| p-nitrophenol | 0.04 | 0.12 | 0.14 | 0.04 |

On the basis of the experiment carried out it could not be established whether the 0.04 ppm found in the untreated sample were derived from added parathion, or from parathion present in the soil at the time of sample-taking or present in the water from the laboratory water deionising plant.

It can, however, be seen that p-nitrophenol is formed on heating to 200° C. and that it first decomposes significantly at temperatures over 240° C.

ca. 60% of the original amount of parathion was found in the untreated sample, whereas the treated samples contained a maximum of 1 5%.

EXAMPLE 4

Autoclave treatment of soil from a now disused case works in Copenhagen.

4.1. Object

The object was to destroy polycyclic aromatic hydrocarbons (PAH) which are the main constituent of the organic material present in gas-works soil. Benz(k)-fluoranthene and benz(a)pyrene were chosen as indicators for PAH.

4.2. The soil material

In taking samples, as much slag-containing and tarry material as possible was included. Iron ore (ferric oxide) could also be present; however, the actual content of soil in the normal sense of the word was probably very low. The general impression was of a black, coarse, slightly moist mass smelling strongly of gas-works.

4.3. Experimental conditions and results

The material had a consistency like moist gravel, with lumps of varying size. Before autoclave treatment it was crushed to a particle size of less than 1.3 mm, and analytical samples were taken for determination of water content and content of PAH.

Autoclave experiments: in all the autoclave experiments, 100 g of crushed soil material (calculated on the basis of dry weight) in 1 liter of water, or water to which base had been added (as specified below), was treated at 260° C.

(1) 25 min., 10 atm $O_2$: filtrate yellowish, slightly grey-green, pH 2.15, smell altered but still slightly tarry. Much $CO_2$, possibly no $O_2$. excess.

(2) 60 min., 20 atm $O_2$, 30 g NaOH: filtrate darkbrown, difficult to filter. Smell still organic, pH 8.6. $O_2$, excess small.

(3) 60 min., 30 atm $O_2$, 30 g $Ca(OH)_2$: filtrate straw-yellow, reasonably easy to filter, smell almost like humus, pH 6.5, large $O_2$-excess.

(4) The results of the third experiment (above) looked satisfactory, but a shorter duration of treatment was desirable. A new experiment was therefore carried out using 30 min. treatment time, 30 atm $O_2$ and 30 g $Ca(OH)_2$. The filtrate was like that in Experiment 3), but the pH was 9.8, possibly because the material was inhomogeneous.

TABLE 4a

| | Water content in the sample subjected to extraction (%) | | | |
|---|---|---|---|---|
| Untreated | Treated | | | |
| | (1) | (2) | (3) | (4) |
| 13 | 28.6 | 25.1 | 33.7 | 28.0 |

Analysis for PAH: Treated and untreated samples were subjected to Soxhlet extraction with toluene, and the crude extracts were analyzed by high performance liquid chromatography (HPLC) with fluorescence detection.

The analytical method was chosen on the basis of the following criteria;

(1) the method is sensitive and specific for the two PAH benz(k)fluoranthene (BkF) and benz(a)pyrene (BaP) which were chosen as PAH indicators.

(2) The method requires a minimum of sample pretreatment.

BkF and BaP are suitable as indicators in this type of investigation because BkF is one of the most stable of the more prevalent PAH and BaP is one of the most reactive, both compounds being regarded as carcinogenic.

The determination of BkF and BaP i the PAH fraction obtained by HPLC fractionation of portions of crude extracts of an untreated and a treated sample, respectively, confirmed the usefulness of this method for the crude extracts. The results for BkF and BaP, and the similarity between the chromatograms for the fractionated samples and the crude extracts also indicate:

(1) that PAH are the main constituents of POM (polycyclic organic material) in the soil, (2) that it is reasonable to focus on PAH alone, and (3) that PAH are either totally degraded on autoclave treatment or converted to water-soluble compounds.

It should also be mentioned that the high content of BaP and BkF in the untreated soil, together with the ratio of BaP to BkF, indicate that PAH are converted only slowly in soil.

Results: the results are shown in Table 4b.

TABLE 4b

| Content (ppm) of benz(a)pyrene and benz(k)fluoranthene in soil | | | | | |
|---|---|---|---|---|---|
| | Experiment No. | | | | |
| Compound | 0* | (1) | (2) | (3) | (4) |
| benz(a)pyrene | 45 | 0.36 | 0.18 | 0.14 | 0.22 |
| benz(k)fluoranthene | 25 | 1.6 | 1.1 | 0.20 | 0.36 |

*Untreated soil 4.4. Biodegradability of organic material present in the filtrate after autoclave treatment Procedure: the effect of various dilutions of the filtrates obtained after autoclave treatments (1), (2) and (3) (see section 4.3 above) on the respiration of the microorganisms present in a typical active sludge used in biological purification plants was investigated. The following filtrate dilutions were employed:

| | |
|---|---|
| 1% dilution: | 2.5 ml filtrate + 247.5 ml distilled water |
| | 50 ml active sludge |
| | 1.5 ml 5% glucose solution |
| | 1.5 ml nutrient solution |
| 10% dilution: | 10 ml filtrate + 90 ml distilled water |
| | 20 ml active sludge |
| | 0.6 ml 5% glucose solution |
| | 0.6 ml nutrient solution |
| 50% dilution: | 25 ml filtrate + 25 ml distilled water |
| | 10 ml active sludge |

-continued

| 100% dilution: | 0.3 ml 5% glucose solution |
| | 0.3 ml nutrient solution |
| | 50 ml filtrate |
| | 10 ml active sludge |
| | 0.3 ml 5% glucose solution |
| | 0.3 ml nutrient solution |

The following two controls, both containing the same relative amounts of components, were also used:

| Control 1: | 250 ml distilled water |
| | 50 ml active sludge |
| | 1.5 ml 5% glucose solution |
| | 1.5 ml nutrient solution |
| Control 2: | 100 ml distilled water |
| | 20 ml active sludge |
| | 0.6 ml 5% glucose solution |
| | 0.6 ml nutrient solution |

The nutrient solution was prepared by mixing equal volumes of the four solutions a, b, c and d whose compositions are given below:

| a. | 8.50 g $KH_2PO_4$ | in 1000 ml |
| | 21.75 g $K_2HPO_4$ | |
| | 27.72 g $NaHPO_4, 2H_2O$ | |
| | 1.70 g $NH_4Cl$ | |
| b. | 22.50 g $MgSO_4, 7H_2O$ | in 1000 ml |
| c. | 54.20 g $CaCl_2, 6H_2O$ | in 1000 ml |
| d. | 0.25 g $FeCl_3, 6H_2O$ | in 1000 ml |

Respiration (see Example 1, section 1.4) was monitored for periods of 10 min. The measurements were performed in duplicate.

Results: the results are shown in Table 4c.

TABLE 4c

| Filtrate | pH Adjustment | Filtrate dilution | Respiration mg $O_2/l \cdot$ I.F.* | |
|---|---|---|---|---|
| (1) | NaOH to pH 7.8 | 50% | 0.58 | ≈1.21 |
| Control | | 0 | 0.48 | |
| (1) | NaOH to pH 7.8 | 100% | 1.73** | ≈3.61 |
| Control | | 0 | 0.48 | |
| (2) | HCl to pH 7.7 | 1% | 0.78 | ≈1.63 |
| Control | | 0 | 0.48 | |
| (2) | HCl to pH 7.7 | 10% | 0.66 | ≈1.38 |
| Control | — | 0 | 0.48 | |
| (2) | HCl to pH 7.7 | 50% | 0.0 | ≈0 |
| Control | — | 0 | 0.48 | |
| (3) | — | 1% | 0.52 | ≈1.0 |
| Control | | 0 | 0.52 | |
| (3) | — | 10% | 0.57 | ≈1.2 |
| Control | | 0 | 0.48 | |
| (3) | — | 100% | 0.47 | ≈1.0 |
| Control | — | 0 | 0.48 | |

*Inhibition factor (I.F) is defined as:
$\frac{\text{respiration with dil. filtrate}}{\text{respiration with control}}$
**Oxygen was completely consumed after 3-4 min., indicating a higher I.F.

For filtrate (1) it can be seen that the inhibition factor (I.F.) increased with increasing filtrate concentration (positive inhibition). In the case of filtrate (2), the inhibition factor decreased with increasing filtrate concentration and inhibition was complete with the 50% filtrate dilution. Filtrate (3) gave rise to no inhibition at any dilution.

Conclusion: wet oxidation of PAH-containing soil using short holding time and a low partial pressure of oxygen leads to a filtrate which is readily biodegradable.

EXAMPLE 5

Autoclave treatment of chromium-polluted soil from a tannery site.

5.1. Object

To extract chromium from chromium-polluted soil.

5.2. The soil material

Soil samples were taken from the site of what was previously a tannery where chromium pollution should be significant. The soil material consisted of stiff, chalky clay containing an appreciable quantity of small stones.

A series of chromium analyses was carried out on randomly chosen lumps of soil from the collected material:

| 1a | 1157 ppm |
| 1b | 1168 ppm |
| 2a | 935 ppm |
| 2b | 1117 ppm |
| 3a | 1161 ppm |
| 3b | 1167 ppm |
| 4a | 1207 ppm |
| 4b | 1175 ppm |
| 5a | 1189 ppm |
| 5b | 1194 ppm |

$x$ = mean = 1147 ± 78 ppm.

5.3. Experimental conditions and results 5.3.1. Experimental series 5.1.

Treatment of chromium compounds in basic solution and under oxidizing conditions leads to the formation of chromate ions, $CrO_4^{2-}$. The chromate ion has an intense yellow color with a slightly greenish tinge at low concentrations (<200 ppm). At higher concentrations the color is bright lemon-yellow.

As an initial experiment, a moist soil sample of 11.3 g, corresponding to 10.0 g of dry material, was treated with 100 ml of 10% NaOH, 1% $Na_2O_2$. The temperature was maintained at 80°–90° C. for ca. 2 hours. This led to extraction of 7% of the chromium.

The loop-autoclave was then used for extraction experiments.

Table 5a gives the reaction conditions for these experiments. In all experiments, 100 g of dried, crushed and sieved material in ⓒne liter of liquid were used. The first experiments employed $H_2O_2$ and sodium hypochlorite as oxidizing agents; subsequent experiments employed $O_2$ from a cylinder, since $O_2$ is cheaper. $Na_2CO_3$ or $NaHCO_3$ were preferred as bases, since they are cheaper than NaOH.

TABLE 5a

| | Experimental Conditions | | | |
|---|---|---|---|---|
| Expt. No. | Oxidizing agent | Other reagents | Time/min. | Temp./°C. |
| 1 | 3.5% $H_2O_2$ | 10% NaOH | 20 | 200 |
| 2 | 3.5% $H_2O_2$ + 0.2% sodium hypochlorite | 10% $Na_2CO_3$ | 20 10 | 200* 200 |
| 3 | 0.2% sodium hypochlorite | 10% $Na_2CO_3$ | 20 | 200 |
| 4 | 5.25% $H_2O_2$ | 10% $Na_2CO_3$ | 30 | 200 |
| 5 | 10 atm $O_2$ | 10% $Na_2CO_3$ | 30 | 200 |
| 6 | 5 atm $O_2$ | 2% $Na_2CO_3$ | 30 | 240 |
| 7 | 10 atm $O_2$ | 5% $Na_2CO_3$ | 30 | 200 |

TABLE 5a-continued

| | Experimental Conditions | | | |
|---|---|---|---|---|
| Expt. No. | Oxidizing agent | Other reagents | Time/min. | Temp./°C. |
| 8 | 10 atm O₂ | 10% Na₂CO₃ | 15 | ca. 165** |

*Experiment 2 was carried out in two stages: initially with 3.5% H₂O₂ for 20 min. at 200° C., followed by cooling, removal of a sample and addition of sodium hypochlorite solution. The autoclave was then reheated to 200° C. and the experiment was terminated after a further 10 min.

**The experimental temperature was 200° C. in all experiments. As the result of a thermometer error this temperature was not attained in Experiment 8. However, the temperature was estimated to be approx. 165° C. This "abortive" experiment is included here to illustrate the influence of temperature (possibly also the influence of treatment time).

Results: the result are shown in Table 5b.

TABLE 5b

| | Extracted chromium (in ppm and %) | | |
|---|---|---|---|
| Expt. | Filtrate (ppm Cr) | Residue (ppm Cr) | % Cr extr.* |
| 1 | 123 | 107 | 91 |
| 2 | 113 121 | 48 | 96 |
| 3 | 67 | 412 | 64 |
| 4 | 118 | 75 | 93 |
| 5 | 104 | 279 | 76 |
| 6 | 138 | 403 | 65 |
| 7 | 86 | 415 | 64 |
| 8 | 48 | 805 | 30 |

*Based on analysis of the residue

It can be seen from the results that of the various experimental conditions employed those of Experiment 2 were the optimum conditions. However, O₂ is to be preferred as oxidizing agent rather than H₂O₂ and hypochlorite. It also appears that Na₂CO₃ concentrations of less than 10% are not advantageous.

5.3.2 Experimental series 5.2

In this series of experiments an attempt was made to optimize the conditions with respect to liquid/solid ratio, O₂-pressure, and the use of Na₂CO₃ contra NaHCO₃. NaHCO₃ was tried since it dissolves silicates to a lesser extent (silicic acid could give problems in the work-up of the chromium-containing solution).

The experimental conditions are given in Table 5c.

TABLE 5c

| | Reaction conditions. | | |
|---|---|---|---|
| Expt. | Liquid/solid | O₂/atm | Carbonate |
| 1 | 5:1 | 10 | 10% Na₂CO₃ |
| 2 | 5:1 | 5 | 10% NaHCO₃ |
| 3 | 10:1 | 5 | 10% Na₂HCO₃ |
| 4 | 10:1 | 10 | 10% NaHCO₃ |

The reaction time and reaction temperature were kept constant at 30 min. and 240° C., respectively.

Results: the results are given in Table 5d.

TABLE 5d

| | Extracted chromium (in ppm and %) | | |
|---|---|---|---|
| Expt. | Filtrate (ppm Cr) (normalised) | Residue (ppm Cr) | % Cr extr.* |
| 1 | 122 | 115 | 90% |
| 2 | 99 | 373 | 67% |
| 3 | 100 | 219 | 81% |
| 4 | 114 | 257 | 78% |

*based on analysis of the residue.

It can be seen from the results that Na₂CO₃ dissolved more chromium than NaHCO₃. This suggests that an appreciable amount of chromium is incorporated in the silicate lattrice and is first librated on treatment with a strong base.

It can also be seen that a pressure of 10 atm O₂ is preferable to 5 atm O₂, whereas the liquid/solid ratio has no great significance. The conditions in Experiment 1 were therefore optimum; it might even anticipated that a temperature of 200° C. would be sufficient.

5.3. Work-up of chromium-containing solutions

Initial attempts were made to reduce $CrO_4^{2-}$ with hydroxylamine, Fe powder, Al powder and FeSO₄, respectively. The best reduction was obtained with Al powder but since this required a very large excess of Al as well as boiling of the solution, the method must be regarded as uneconomical. FeSO₄ gave no detectable reduction.

Traditional precipitation of $CrO_4^{2-}$ with e.g. $Ba^{2+}$ or $Pb^{2+}$ could not be employed since carbonate in the solution would also be precipitated.

Ion-exchange on an anion exchanger was also attempted but as also observed previously, Na₂CO₃ concentrations of >0.5% prevent binding of $CrO_4^{2-}$ to the anion exchanger.

The most promising results were obtained using liquid-liquid extraction. Chromium in carbonate-containing solution can be extracted using aliquat 336, from which chromium can be stripped with NH₄Cl in ammoniacal solution.

5.4. Leaching experiments

Since the filtration properties of the suspension were poor when the suspension was washed on the filter, washing with the aid of sedimentation was tried. The degree of leaching was investigated at the same time.

Method: A portion of 133.7 g of wet filter-cake, corresponding to 82.2 g of dry-matter (not washed on the filter) was suspended in ca. 250 ml of distilled water in a conical flask. The total volume of the suspension was ca. 300 ml.

The flast and contents were placed in an automatic shaker. After shaking for 24 hours the flask was allowed to stand to allow the content to sediment and the clear solution was withdrawn. A new volume of distilled water was added to give a total volume of ca. 300 ml and the entire procedure was repeated. A total of 3 such washing cycles were carried out. After each wash the sedimentability was observed and the chromium content of the washings was determined.

Results: the results are shown in Table 5e.

TABLE 5e

| Wash | 0* | 1 | 2 | 3 |
|---|---|---|---|---|
| Total washing volume ml | 51.5 | 300.7 | 306.7 | 330.5 |
| Withdrawn ml | 0 | 155 | 170 | 155 |
| Sedimentability | — | good | poor | very poor |
| Na₂CO₃ % | 10.0 | 1.71 | 0.81 | 0.37 |
| Dilution factor | — | 5.84 | 2.12 | 2.21 |
| Expected Cr ppm | 198 | 33.9 | 15.3 | 6.9 |
| Found Cr ppm | 198 | 33 | 17 | 7.6 |
| Leached Cr % | — | 97.4 | 111 | 110 |

*Filter-cake
Example of calculation: Expected Cr (wash 1):

$$\text{Dilution factor} = \frac{300.7}{51.5} = 5.84$$

$$Cr_{expected} = \frac{198}{5.84} = 33.9$$

The sedimentability was observed to decrease with decreasing ionic strength. One would expect to have to use a minimum Na₂CO₃ concentration of 1.5% in order to obtain reasonable sedimentation.

Nevertheless, all accessible chromium was leached. The degree of leaching was greater than 100% in the last two washing procedures, which might imply that insoluble chromium present after the autoclave treatment is rendered potentially soluble.

Corresponding leaching experiments carried out with a dried residue which had been subjected to a standard washing procedure confirm this possibility.

5.5. Shaker Experiments

To three flasks each containing 15 g of dried and washed residue (75 ppm Cr) were added 150 ml of 0.05 N $H_2SO_4$, 0.05 N $CH_3COOH$ and distilled water, respectively. Samples of 10 ml were withdrawn at regular intervals. In order to keep the liquid/solid ratio constant, 10 ml of a 0.75 N solution of the appropriate acid or water was added each time a sample was withdrawn.

The samples were analyzed for Cr.

Results: the results are shown in Table 5f.

TABLE 5f

| Days | ppm Cr (pH) | | |
|---|---|---|---|
| | $H_2O$ | $CH_3COOH$ | $H_2SO_4$ |
| 1 | 1.1 (9.11) | 0.5 (6.31) | 0.6 (7.10) |
| 2 | 1.4 (9.97) | 0.6 (6.20) | <0.2 (5.10) |
| 3 | 1.2 (9.78) | 0.4 (5.82) | <0.2 (7.10) |
| 4 | 1.2 (9.86) | 0.4 (6.30) | <0.2 (4.31) |
| 7 | 1.4 (9.68) | 0.3 (7.13) | <0.2 (7.48) |
| 8 | 1.0 (9.68) | 0.4 (6.06) | 0.2 (4.83) |
| 9 | 1.3 (9.48) | 0.4 (6.07) | 0.5 (4.24) |
| 10 | 1.5 (9.03) | 0.4 (6.64) | 0.3 (3.55) |

It can be seen that the solubility decreased with decreasing pH (increasing acid strength). Cr was most mobile in $H_2O$; the high pH was due to the pre-treatment with $Na_2CO_3$. It appears that an equilibration occurs as long as there is sufficient Cr remaining in the residue, since the concentration of Cr remained almost constant in spite of dilution.

A corresponding experiment using starting material (soil) suspended in $H_2O$ led to no release of Cr whatsoever (within the limit of detection).

We claim:

1. A method for treating polluted soil so as to decompose or modify oxidizable polluting substances therein, and improve the filterability of solids present therein, wherein the polluted soil is in the form of an aqueous suspension and is subjected to wet oxidation in a reactor, the wet oxidation being achieved by an oxidizing agent which is added to the aqueous suspension of the polluted soil in an amount which is at least sufficient to decompose or modify the oxidizable substances, the wet oxidation being performed to such an extent that the decomposed or modified substances remaining after the wet oxidation are substantially biodegradable.

2. A method for treating polluted soil so as the decompose or modify oxidizable polluting substances therein, and improve the filterability of solids present therein, wherein the polluted soil is in the form of an aqueous suspension and is subjected to wet oxidation in a tubular reactor through which said suspension flows with a substantially continuous turbulent flow, having a Reynolds number of at least 4,000, the wet oxidation being achieved by an oxidizing agent which is added to the aqueous suspension of the polluted soil in an amount which at least sufficient to decompose or modify the oxidizable substances, the wet oxidation being performed to such an extent that the decomposed or modified substances remaining after the wet oxidation are substantially biodegradable.

3. A method according to claims 1 or 2, wherein the suspension of treated material after wet oxidation is separated into a solid and a liquid phase.

4. A method according to claim 3, wherein the polluted material contains heavy metals and the method further comprises substantially removing said heavy metals from the separated liquid phase.

5. A method according to claim 3, wherein the resulting separated liquid phase is subjected to a biodegradation process.

6. A method according to claims 1 or 2, wherein the wet oxidation is performed in a substantially horizontally arranged reactor.

7. A method according to claim 2, wherein the wet oxidation is performed in a substantially horizontally arranged reactor comprising a single tube.

8. A method according to claim 2, wherein the wet oxidation is performed in a substantially horizontally arranged reactor comprising a plurality of interconnected tubes.

9. A method according to claim 2, wherein the wet oxidation is performed in a substantially horizontally arranged plug flow tubular reactor comprising a single tube.

10. A method according to claim 2, wherein the wet oxidation is performed in a substantially horizontally arranged plug flow tubular reactor comprising a plurality of interconnected tubes.

11. A method according to claims 1 or 2, wherein the concentration of solids in the aqueous suspension is in the range of 10-60% (weight/volume).

12. A method according to claim 2, wherein the concentration of solids in the aqueous suspension is in the range of 40-60% (weight/volume).

13. A method according to claim 2, wherein the concentration of solids in the aqueous suspension is about 50% (weight/volume).

14. A method according to claim 1 or 2, wherein the size of substantially all of the solid particles in the aqueous suspension is at the most about 2 mm.

15. A method according to claim 1 or 2, wherein the oxidizing agent is selected from the group consisting of: an oxygen-containing gas, hydrogen peroxide, a percarbonate, a peroxodisulphate, a permanganate, a peracetate, a phpochlorite and chlorine.

16. A method according to claim 1 or 2, wherein the oxidizing agent is an oxygen-containing gas containing more than 20% of oxygen by volume.

17. A method according to claim 1 or 2, wherein the oxidizing agent is an oxygen-containing gas containing more than 80% of oxygen by volume.

18. A method according to claim 1 or 2, wherein the oxidizing agent is an oxygen-containing gas containing 100% of oxygen by volume.

19. A method according to claim 1 or 2, wherein the oxidizing agent is an oxygen-containing gas and is added in an amount corresponding to an oxygen amount of at least 100% of that calculated on the basis of the COD value of the polluted material to be treated.

20. A method according to claim 1 or 2, wherein the oxidizing agent is an oxygen-containing gas and is added in an amount corresponding to an oxygen amount in the range of about 105-200% of that calculated on the basis of the COD value of the polluted material to be treated.

21. A method according to claim 1 or 2, wherein the oxidizing agent is an oxygen-containing gas and is added in an amount corresponding to an oxygen amount in the range of 110-160% of that calculated on the basis of the COD value of the polluted material to be treated.

22. A method according to claim 1 or 2, wherein the oxidizing agent is an oxygen-containing gas and is introduced into the reactor through several inlets located at different positions in the reactor.

23. A method according to claim 1 or 2, wherein the aqueous suspension of polluted material in the reactor is first heated in a heating zone of the reactor to a temperature which is sufficient for initiating the decomposition or modification of oxidizable substances in the material, then maintained in a reaction zone of the reactor at a temperature at which the decomposition or modification proceeds until substances remaining after the wet oxidation are substantially biodegradable, and then cooled in a cooling zone of the reactor.

24. A method according to claim 1 or 2, wherein an oxidation catalyst is added to the polluted material to be subjected to wet oxidation.

25. A method according to claim 2, wherein the flow of the suspension through the reactor has a Reynolds number of at least 10,000.

26. A method according to claim 2, wherein the flow of the suspension through the reactor has a Reynolds number of at last 20,000.

27. A method according to claim 2, wherein the flow of the suspension through the reactor has a Reynolds number of at least 30,000.

28. A method according to claim 2, wherein the flow of the suspension through the reactor has a Reynolds number of at most 100,000.

29. A method according to claim 2, wherein the flow of the suspension through the reactor has a Reynolds number of at most 80,000.

30. A method according to claim 2, wherein the flow of the suspension through the reactor has a Reynolds number of at most 60,000.

31. A method according to claim 2, wherein the flow rate of the suspension through the reactor is in the range of 1.2-2.2 m/s.

32. A method according to claim 2, wherein the flow rate of the suspension through the reactor is in the range of 1.4-2.0 m/s.

33. A method according to claim 2, wherein the flow rate of the suspension through the reactor is in the range of 1.7-1.8 m/s.

34. A method according to claim 1 or 2, wherein the holding time of the polluted material in the reactor under oxidizing conditions is in the range of 5-60 min.

35. A method according to claim 1 or 2, wherein the holding time of the polluted material in the reactor under oxidizing conditions is in the range of 10-50 min.

36. A method according to claim 1 or 2, wherein the holding time of the polluted material in the reactor under oxidizing conditions is in the range of 20-40 min.

37. A method according to claim 1 or 2, wherein the wet oxidation is performed at a temperature in the range of 150°-300° C. and at a pressure, which is at least sufficient to prevent boiling of the liquid in the suspension.

38. A method according to claim 1 or 2, wherein the wet oxidation is performed at a temperature in the range of 200°-260° C. and at a pressure, which is at least sufficient to prevent boiling the liquid in the suspension.

39. A method according to claim 1 or 2, wherein a pH-regulating agent is added to the polluted material to be subjected to wet oxidation.

40. A method according to claim 39, wherein the pH-regulating agent is a base selected from the group consisting of: alkali metal hydroxides, carbonates and bicarbonates; alkali earth metal hydroxides, carbonates and bicarbonates; ammonia; and organic bases.

41. A method according to claim 1, wherein the polluted soil in the form of an aqueous suspension is subjected to wet oxidation in a reactor at a temperature in the range of 150° C. to 300° C.

* * * * *